US008830540B2

(12) United States Patent
Fukuma et al.

(10) Patent No.: US 8,830,540 B2
(45) Date of Patent: *Sep. 9, 2014

(54) IMAGE READING DEVICE AND IMAGE FORMING APPARATUS

(75) Inventors: Nobuhiro Fukuma, Osaka (JP); Daisuke Fujiwara, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 26 days.

This patent is subject to a terminal disclaimer.

(21) Appl. No.: 13/433,143

(22) Filed: Mar. 28, 2012

(65) Prior Publication Data

US 2012/0250110 A1 Oct. 4, 2012

(30) Foreign Application Priority Data

Mar. 31, 2011 (JP) ................. 2011-078389

(51) Int. Cl.
*H04N 1/04* (2006.01)
*H04N 1/024* (2006.01)
*H04N 1/028* (2006.01)
*H04N 1/46* (2006.01)
*H04N 1/10* (2006.01)
*H04N 1/193* (2006.01)

(52) U.S. Cl.
CPC ............ *H04N 1/0249* (2013.01); *H04N 1/1013* (2013.01); *H04N 2201/0081* (2013.01); *H04N 2201/0241* (2013.01); *H04N 1/02481* (2013.01); *H04N 2201/02485* (2013.01); *H04N 2201/02474* (2013.01); *G03G 2215/0132* (2013.01); *H04N 1/02835* (2013.01); *H04N 1/193* (2013.01); *H04N 2201/02425* (2013.01); *H04N 2201/02435* (2013.01); *H04N 2201/02462* (2013.01)

USPC ............................ 358/475; 358/480; 358/509

(58) Field of Classification Search
None
See application file for complete search history.

(56) References Cited

U.S. PATENT DOCUMENTS

| 2009/0003000 | A1 | 1/2009 | Saito et al. |
| 2009/0034030 | A1 | 2/2009 | Nagatani et al. |
| 2011/0216541 | A1* | 9/2011 | Inoue et al. ............. 362/296.09 |
| 2012/0281246 | A1 | 11/2012 | Nagatani et al. |

FOREIGN PATENT DOCUMENTS

| CN | 101360170 A | 2/2009 |
| JP | 2009-75184 A | 4/2009 |
| JP | 2010-107757 | 5/2010 |
| JP | 2010-283436 | 12/2010 |
| JP | 2012-165151 | 8/2012 |
| TW | 200803455 A | 1/2008 |

* cited by examiner

*Primary Examiner* — Thierry L Pham
(74) *Attorney, Agent, or Firm* — Knobbe Martens Olson & Bear LLP

(57) ABSTRACT

The present disclosure relates to an image reading device, including: a light emitting portion; a light guiding member; a holding member that holds the light emitting portion and the light guiding member; and a case member that holds the holding member. In the image reading device, the light guiding member is shaped like a stick, of which end portion is disposed to face the light emitting portion. The holding member holds the light emitting portion and the light guiding member. In addition, the holding member has: and a holding portion that disposes the light guiding member along a main scanning direction, and positions and holds an end portion on the light emitting portion side in the main scanning direction. The case member holds the holding member.

10 Claims, 14 Drawing Sheets

IMAGE READING DEVICE AND IMAGE FORMING APPARATUS

This application is based on and claims the benefit of priority from Japanese Patent Application No. 2011-078389, filed on 31 Mar. 2011, the content of which is incorporated herein by reference.

BACKGROUND

The present disclosure relates to an image reading device and an image forming apparatus.

In recent years, with the background of environmental issues, there is an image reading device that employs an LED as a light source. As such an image reading device that employs an LED, for example, there is an image reading device that is configured to dispose a plurality of LEDs in a main scanning direction at a predetermined interval.

However, the image reading device that requires a plurality of LEDs has been disadvantageous in terms of cost performance in some cases.

In contrast, as another image reading device that employs an LED as a light source, there is an image reading device that disposes a high-intensity LED on one end side in a main scanning direction, in which a long stick-like light guiding member composed of acryl or polycarbonate is disposed to extend in the main scanning direction.

The image reading device that employs such a configuration requires only a single (or a small number of) LED(s), and thus is advantageous in terms of cost performance.

SUMMARY

The present disclosure relates to an image reading device that includes: a light emitting portion; a light guiding member; a holding member that holds the light emitting portion and the light guiding member; and a case member that holds the holding member.

In the image reading device, the light guiding member is shaped like a stick, of which end portion is disposed to face the light emitting portion. The holding member holds the light emitting portion and the light guiding member. In addition, the holding member has: a holding portion that disposes the light guiding member along a main scanning direction, and positions and holds an end portion on the light emitting portion side in the main scanning direction. The case member holds the holding member.

Moreover, the present disclosure relates to an image forming apparatus that includes the image reading device.

In the image forming apparatus, the image reading device includes: a light emitting portion; a light guiding member; a holding member that holds the light emitting portion and the light guiding member; and a case member that holds the holding member.

In the image reading device, the light guiding member is shaped like a stick, of which end portion is disposed to face the light emitting portion. The holding member holds the light emitting portion and the light guiding member. In addition, the holding member has: and a holding portion that disposes the light guiding member along a main scanning direction, and positions and holds an end portion on the light emitting portion side in the main scanning direction. The case member holds the holding member.

DETAILED DESCRIPTION

Descriptions are hereinafter provided for an embodiment of an image forming apparatus according to the present disclosure with reference to the drawings.

Figure 1:
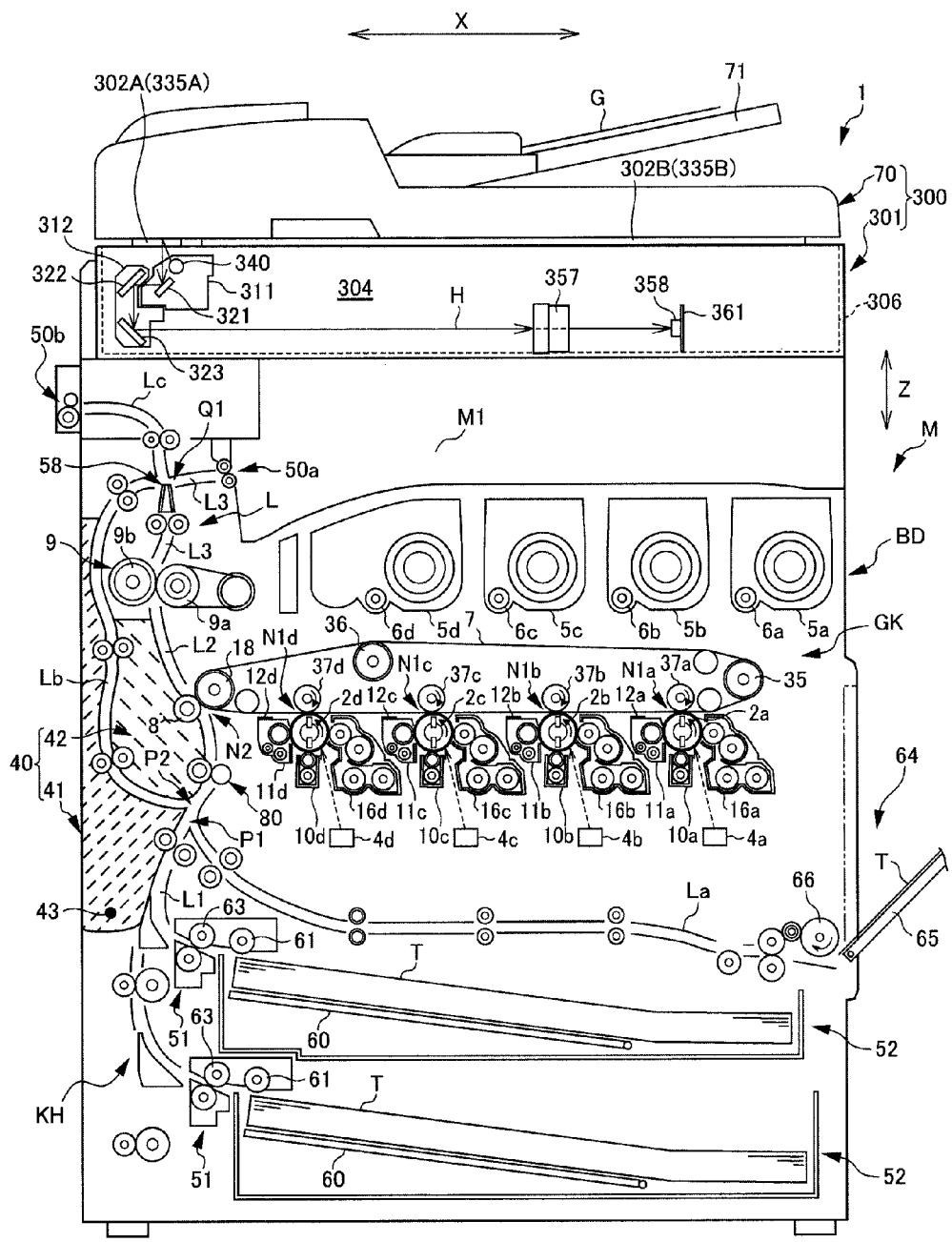
FIG. 1 is a diagram for illustrating arrangement of components of a copy machine 1 as an image forming apparatus.

An overall configuration of a copy machine 1 as the image forming apparatus of the present embodiment will be described with reference to FIG. 1. FIG. 1 is a diagram for illustrating arrangement of components of the copy machine 1 as the image forming apparatus.

As shown in FIG. 1, the copy machine 1 as the image forming apparatus includes: an image reading device 300 that is disposed at an upper side in a perpendicular direction Z of the copy machine 1; and an apparatus main body M, which is disposed at a lower side in the perpendicular direction Z of the copy machine 1, and which forms a toner image on a sheet of paper T as a sheet-like target material, based on image information that is read from the image reading device 300.

It should be noted that, in the following descriptions of the copy machine 1, a sub scanning direction X is also referred to as a "lateral direction" of the copy machine 1, and a main scanning direction Y (a direction penetrating into FIG. 1; see FIG. 2) is also referred to as a "depth direction" of the copy machine 1. The perpendicular direction Z of the copy machine 1 is orthogonal to the sub scanning direction X and the main scanning direction Y.

Firstly, descriptions are provided for the image reading device 300.

As shown in FIG. 1, the image reading device 300 includes: a reader unit 301 that reads an image of an original G; and an original feed unit 70 that is disposed on an upper side of the reader unit 301 and feeds the original G to the reader unit 301.

The reader unit 301 includes: a housing 306; and a first reader surface 302A and a second reader surface 302B that are disposed on an upper side of the housing 306. Moreover, the reader unit 301 includes, in an internal space 304 of the housing 306: a light guiding member 340 that irradiates the original G mounted on the first reader surface 302A or the second reader surface 302B with light received from a light emitting portion that serves as a light source; a plurality of mirrors 321, 322 and 323; a first frame body 311 and a second frame body 312 that are case members and move in the sub scanning direction X; an imaging lens 357; a CCD 358 that serves as reading means; and a CCD substrate 361 that performs predetermined processing on image information that is read by the CCD 358, and outputs the image information to the apparatus main body M. The light guiding member 340 and the mirror 321 are housed in the first frame body 311. The second mirror 322 and the third mirror 323 are housed in the second frame body 312.

The light guiding member 340 and a light emitting portion as the light source are assembled into the first frame body 311 as the case member, and are unitized as a light emitting unit 400 (see FIG. 2) to be attached to the housing 306.

The light emitting unit 400 will be described later in detail.

The original feed unit 70 is connected with the reader unit 301 by way of a connecting portion (not illustrated) so as to be openable and closable. The original feed unit 70 includes: an original mounting portion 71 on an upper side thereof; and feed rollers (not illustrated) in an inside thereof. The original feed unit 70 has a function of protecting the first reader surface 302A and the second reader surface 302B of the reader unit 301.

The first reader surface 302A is a reader surface that is used when reading the original G that is fed by the original feed unit 70. The first reader surface 302A is formed along an upper surface of a first contact glass 335A to which the original G is fed. The first reader surface 302A is positioned in the vicinity of a left lateral face of the housing 306. It should be noted that such a position shown in FIG. 1 is also referred to as a "first reading position".

The second reader surface 302B is a reader surface that is used when reading the original G without using feed by the original feed unit 70. The second reader surface 302B is formed along an upper surface of a second contact glass 335B on which the original G is mounted. The second reader surface 302B is disposed more to the right than the first reader surface 302B, and spans large portions of the reader unit 301 in the sub scanning direction X.

The first reader surface 302A and the second reader surface 302B extend in a direction orthogonal to the sub scanning direction X and the main scanning direction Y.

The original G that is fed by the original feed unit 70 is mounted on the original mounting portion 71 for reading. The original G that is mounted on the original mounting portion 71 is fed to the first reader surface 302A of the reader unit 301 by the feed rollers provided inside the original feed unit 70. In this case, the first frame body 311 and the second frame body 312 do not move but remain in the first reading position. In addition, as the original feed unit 70 slidingly feeds the original G on the first reader surface 302A, the CCD 358 reads an image that has been formed on a surface of the original G.

When the original feed unit 70 is in an opened state, the original G is mounted on the second reader surface 302B. In this case, the first frame body 311 and the second frame body 312 each move in the sub scanning direction X, while maintaining a length of a light path H (to be described later) constant. As a result, an image of the original G that is mounted on the second reader surface 302B is read.

In the internal space 304 of the housing 306, the plurality of mirrors 321, 322 and 323 form the light path H through which the light from the original G is incident upon the imaging lens 357. Furthermore, the first frame body 311 moves in the sub scanning direction X at a predetermined speed A, and the second frame body 312 moves in the sub scanning direction X at a predetermined speed A/2; consequently, the length of the light path H is maintained constant even while reading an image.

Next, descriptions are provided for the apparatus main body M.

The apparatus main body M includes: an image forming unit GK that forms a predetermined toner image on the sheet of paper T based on predetermined image information; and a paper feeding/ejection portion KH that feeds the sheet of paper T to the image forming unit GK, and ejects the sheet of paper T on which a toner image has been formed.

An external shape of the apparatus main body M is composed of a case body BD as a housing.

As shown in FIG. 1, the image forming unit GK includes: photoreceptor drums 2a, 2b, 2c and 2d as image supporting bodies (photoreceptors); charging portions 10a, 10b, 10c and 10d; laser scanner units 4a, 4b, 4c and 4d as exposure units; developing units 16a, 16b, 16c and 16d; toner cartridges 5a, 5b, 5c and 5d; toner feeding portions 6a, 6b, 6c and 6d; drum cleaning portions 11a, 11b, 11c and 11d; static eliminators 12a, 12b, 12c and 12d; an intermediate transfer belt 7; primary transfer rollers 37a, 37b, 37c and 37d; a secondary transfer roller 8; an opposing roller 18; and the fusing unit 9.

As shown in FIG. 1, the paper feeding/ejection portion KH includes a paper feeding cassette 52, a manual feeding portion 64, a paper path L for the paper T, a resist roller pair 80, a first ejection portion 50a, and a second ejection portion 50b. It should be noted that the paper path L is an assembly of a first paper path L1, a second paper path L2, a third paper path L3, a manual paper path La, a reverse paper path Lb, and a post-processing paper path Lc.

Components of the image forming unit GK and the paper feeding/ejection portion KH are described hereinafter in detail.

Firstly, descriptions are provided for the image forming unit GK.

In the image forming unit GK, charging by the charging portions 10a, 10b, 10c and 10d; exposure by the laser scanner units 4a, 4b, 4c and 4d; development by the developing units 16a, 16b, 16c and 16d; primary transfer by the intermediate transfer belt 7 and the primary transfer rollers 37a, 37b, 37c and 37d; static elimination by the static eliminators 12a, 12b, 12c and 12d; and cleaning by the drum cleaning portions 11a, 11b, 11c and 11d are sequentially performed on a surface of the photoreceptor drums 2a, 2b, 2c and 2d from an upstream side to a downstream side.

In addition, in the image forming unit GK, secondary transfer is performed by the intermediate transfer belt 7, the secondary transfer roller 8 and the opposing roller 18, and fixation is performed by the fusing unit 9.

Each of the photoreceptor drums 2a, 2b, 2c and 2d is composed of a cylindrically shaped member, and functions as a photoreceptor or an image supporting body. Each of the photoreceptor drums 2a, 2b, 2c and 2d is disposed to be rotatable in a direction of an arrow, about a rotational axis that extends in a direction orthogonal to a direction of movement of the intermediate transfer belt 7. An electrostatic latent image can be formed on a surface of each of the photoreceptor drums 2a, 2b, 2c and 2d.

The charging portions 10a, 10b, 10c and 10d are disposed to face the surfaces of the photoreceptor drums 2a, 2b, 2c and 2*d*, respectively. The charging portions 10*a*, 10*b*, 10*c* and 10*d* uniformly negatively charge (negative polarity) or positively charge (positive polarity) the surfaces of the photoreceptor drums 2*a*, 2*b*, 2*c* and 2*d*, respectively.

The laser scanner units 4*a*, 4*b*, 4*c* and 4*d* that function as exposure units are disposed to be spaced apart from the surfaces of the photoreceptor drums 2*a*, 2*b*, 2*c* and 2*d*, respectively. Each of the laser scanner units 4*a*, 4*b*, 4*c* and 4*d* is configured to include a laser light source, a polygonal mirror, a polygonal mirror driving motor and the like, which are not illustrated.

The laser scanner units 4*a*, 4*b*, 4*c* and 4*d* scan and expose the surfaces of the photoreceptor drums 2*a*, 2*b*, 2*c* and 2*d*, respectively, based on the image information related to the image that is read by the reader unit 301. Scanning and exposing by the laser scanner units 4*a*, 4*b*, 4*c* and 4*d* remove electric charges of parts thus exposed on the surfaces of the photoreceptor drums 2*a*, 2*b*, 2*c* and 2*d*, respectively. In this way, an electrostatic latent image is formed on the surface of each of the photoreceptor drums 2*a*, 2*b*, 2*c* and 2*d*.

The developing units 16*a*, 16*b*, 16*c* and 16*d* are disposed correspondingly to the photoreceptor drums 2*a*, 2*b*, 2*c* and 2*d* so as to face the corresponding surfaces of the photoreceptor drums 2*a*, 2*b*, 2*c* and 2*d*, respectively. The developing units 16*a*, 16*b*, 16*c* and 16*d* depose color toners on the electrostatic latent images formed on the surfaces of the photoreceptor drums 2*a*, 2*b*, 2*c* and 2*d*, and form color toner images on the surfaces of the photoreceptor drums 2*a*, 2*b*, 2*c* and 2*d*, respectively. The developing units 16*a*, 16*b*, 16*c* and 16*d* correspond to four colors of yellow, cyan, magenta and black, respectively. The developing units 16*a*, 16*b*, 16*c* and 16*d* are each configured to include a developing roller disposed to face the surfaces of the photoreceptor drums 2*a*, 2*b*, 2*c* and 2*d*, a stirring roller for stirring toner, and the like.

The toner cartridges 5*a*, 5*b*, 5*c* and 5*d* are provided correspondingly to the developing units 16*a*, 16*b*, 16*c* and 16*d*, respectively, and store the toners of different colors to be supplied to the developing units 16*a*, 16*b*, 16*c* and 16*d*, respectively. The toner cartridges 5*a*, 5*b*, 5*c* and 5*d* store toners of yellow, cyan, magenta and black, respectively.

The toner feeding portions 6*a*, 6*b*, 6*c* and 6*d* are provided correspondingly to the toner cartridges 5*a*, 5*b*, 5*c* and 5*d* and the developing units 16*a*, 16*b*, 16*c* and 16*d*, respectively; and the toner feeding portions 6*a*, 6*b*, 6*c* and 6*d* supply the color toners stored in the toner cartridges 5*a*, 5*b*, 5*c* and 5*d* to the developing units 16*a*, 16*b*, 16*c* and 16*d*, respectively. The toner feeding portions 6*a*, 6*b*, 6*c* and 6*d* are connected to the developing units 16*a*, 16*b*, 16*c* and 16*d*, respectively, via toner feeding paths (not illustrated).

Toner images of respective colors formed on the photoreceptor drums 2*a*, 2*b*, 2*c* and 2*d* are sequentially primarily transferred onto the intermediate transfer belt 7. The intermediate transfer belt 7 is stretched around a driven roller 35, the opposing roller 18 composed of a driving roller, a tension roller 36, and the like. Since the tension roller 36 biases the intermediate transfer belt 7 from inside to outside, a predetermined tension is applied to the intermediate transfer belt 7.

The primary transfer rollers 37*a*, 37*b*, 37*c* and 37*d* are disposed on the opposite sides of the photoreceptor drums 2*a*, 2*b*, 2*c* and 2*d*, respectively, so as to sandwich the intermediate transfer belt 7.

Predetermined parts of the intermediate transfer belt 7 are nipped between the primary transfer rollers 37*a*, 37*b*, 37*c* and 37*d* and the photoreceptor drums 2*a*, 2*b*, 2*c* and 2*d*, respectively. The predetermined nipped parts are pressed against the surfaces of the photoreceptor drums 2*a*, 2*b*, 2*c* and 2*d*. Primary transfer nips N1*a*, N1*b*, N1*c* and N1*d* are formed between the photoreceptor drums 2*a*, 2*b*, 2*c* and 2*d* and the primary transfer rollers 37*a*, 37*b*, 37*c* and 37*d*, respectively. At the primary transfer nips N1*a*, N1*b*, N1*c* and N1*d*, respectively, toner images of the respective colors developed on the photoreceptor drums 2*a*, 2*b*, 2*c* and 2*d* are sequentially primarily transferred onto the intermediate transfer belt 7. In this manner, a full-color toner image is formed on the intermediate transfer belt 7.

Primary transfer bias application portions (not illustrated) apply a primary transfer bias to the primary transfer rollers 37*a*, 37*b*, 37*c* and 37*d*, for the purpose of transferring the toner images of the colors formed on the photoreceptor drums 2*a*, 2*b*, 2*c* and 2*d* onto the intermediate transfer belt 7.

The static eliminators 12*a*, 12*b*, 12*c* and 12*d* are disposed to face the surfaces of the photoreceptor drums 2*a*, 2*b*, 2*c* and 2*d*, respectively. The static eliminators 12*a*, 12*b*, 12*c* and 12*d* remove electricity (eliminate an electrical charge) from the surfaces of the photoreceptor drums 2*a*, 2*b*, 2*c* and 2*d*, on which the primary transfer has been performed, by irradiating the surfaces of the photoreceptor drums 2*a*, 2*b*, 2*c* and 2*d*, respectively, with light.

The drum cleaning portions 11*a*, 11*b*, 11*c* and 11*d* are disposed to face the surfaces of the photoreceptor drums 2*a*, 2*b*, 2*c* and 2*d*, respectively. The drum cleaning portions 11*a*, 11*b*, 11*c* and 11*d* remove toner and attached matter remaining on the surfaces of the photoreceptor drums 2*a*, 2*b*, 2*c* and 2*d*, respectively, and feed the removed toner to a predetermined collection mechanism for collection.

The secondary transfer roller 8 secondarily transfers the full-color toner image, which has been primarily transferred to the intermediate transfer belt 7, to the sheet of paper T. Secondary transfer bias application portions (not illustrated) apply a secondary bias to the secondary transfer roller 8 for the purpose of transferring the full-color toner image formed on the intermediate transfer belt 7 to the sheet of paper T.

The secondary transfer roller 8 selectively abuts and is separated from the intermediate transfer belt 7. More specifically, the secondary transfer roller 8 is configured to be movable between an abutting position of abutting the intermediate transfer belt 7, and a separated position of being separated from the intermediate transfer belt 7. In particular, the secondary transfer roller 8 is disposed in the abutting position when secondarily transferring the toner image, which has been primarily transferred to the surface of the intermediate transfer belt 7, to the sheet of paper T, and is otherwise disposed in the separated position.

The opposing roller 18 is disposed on the opposite side of the secondary transfer roller 8 so as to sandwich the intermediate transfer belt 7. A predetermined part of the intermediate transfer belt 7 is sandwiched between the secondary transfer roller 8 and the opposing roller 18. The sheet of paper T is pressed against an outer surface of the intermediate transfer belt 7 (the surface onto which the toner image has been primarily transferred). A secondary transfer nip N2 is formed between the intermediate transfer belt 7 and the secondary transfer roller 8. At the secondary transfer nip N2, the full-color toner image, which has been primarily transferred to the intermediate transfer belt 7, is secondarily transferred to the sheet of paper T.

The fusing unit 9 fuses and pressurizes color toners composing the toner image, which has been secondarily transferred to the sheet of paper T, and fixes the color toners on the sheet of paper T. The fusing unit 9 includes a heating rotator 9*a* that is heated by a heater, and a pressurizing rotator 9*b* that is brought into pressurized contact with the heating rotator 9*a*. The heating rotator 9*a* and the pressurizing rotator 9*b* nip and compress, and feed the sheet of paper T, to which the toner image has been secondarily transferred. Since the sheet of paper T is fed while being nipped between the heating rotator 9a and the pressurizing rotator 9b, the toner transferred to the sheet of paper is fused and pressurized to be fixed on the sheet of paper T.

Next, descriptions are provided for the paper feeding/ejection portion KH.

As shown in FIG. 1, two paper feeding cassettes 52 that store the sheets of paper T are disposed in vertical arrangement in a lower portion of the apparatus main body M. The paper feeding cassettes 52 are configured to be withdrawable from the housing of the apparatus main body M in a horizontal direction. A paper tray 60 for placing the sheets of paper T is disposed in both the paper feeding cassettes 52. The paper feeding cassette 52 stores the sheets of paper T as being stacked on the paper tray 60. A sheet of paper T placed on the paper tray 60 is fed to the paper path L by a cassette feeding portion 51 that is disposed at the end on a paper feeding side (a left end of FIG. 1) of the paper feeding cassettes 52. The cassette feeding portion 51 includes a double feed preventing mechanism that is composed of: a forward feed roller 61 for picking up the sheet of paper T from the paper tray 60; and a feed roller pair 63 for feeding the sheet of paper T one at a time to the paper path L.

The manual feeding portion 64 is provided on a right lateral face (the right side in FIG. 1) of the apparatus main body M. The manual feeding portion 64 is primarily provided for the purpose of feeding a sheet of paper T, which is different in size and type from the sheets of paper T stored in the paper feeding cassette 52, to the apparatus main body M. The manual feeding portion 64 includes a manual feeding tray 65 and a paper feeding roller 66, in which the manual feeding tray 65 in its closed state composes a part of the right lateral face of the apparatus main body M. A lower end of the manual feeding tray 65 is pivotally connected (so as to be openable and closable) to the apparatus main body M in the vicinity of the paper feeding roller 66. A sheet or sheets of paper T are placed on the manual feeding tray 65 in the opened state. The paper feeding roller 66 feeds the sheet of paper T, which is placed on the manual feeding tray 65 in the opened state, to the manual paper path La.

The first ejection portion 50a and the second ejection portion 50b are provided on an upper side of the apparatus main body M. The first ejection portion 50a and the second ejection portion 50b eject the sheet of paper T to the outside of the apparatus main body M. The first ejection portion 50a and the second ejection portion 50b will be described later in detail.

The paper feed path L includes: the first paper path L1 from the cassette feeding portion 51 to the secondary transfer nip N2; the second paper path L2 from the secondary transfer nip N2 to the fusing unit 9; the third paper path L3 from the fusing unit 9 to the first ejection portion 50a; the manual paper path La that guides the sheet of paper fed from the manual feeding portion 64 to the first paper path L1; the reverse paper path Lb that reverses and returns the sheet of paper, which is fed from an upstream side to a downstream side in the third paper path L3, to the first paper path L1; and a post-processing paper path Lc that feeds the sheet of paper, which is fed from the upstream side to the downstream side in the third paper path L3, to a post-processing device (not illustrated) that is connected to the second ejection portion 50b.

In addition, a first junction P1 and a second junction P2 are provided somewhere along the first paper path L1. A first branch portion Q1 is provided somewhere along the third paper path L3.

The first junction P1 is a junction where the manual paper path La joins the first paper path L1. The second junction P2 is a junction where the reverse paper path Lb joins the first paper path L1.

The first branch portion Q1 is a branch portion where the post-processing paper path Lc branches off the third paper path L3. A switching member 58 is provided in the first branch portion Q1. The switching member 58 shifts (switches) a feeding direction of the sheet of paper T ejected from the fusing unit 9 to the third paper path L3 leading to the first ejection portion 50a, or to the post-processing paper path Lc leading to the second ejection portion 50b.

In addition, a sensor for detecting the sheet of paper T and a resist roller pair 80 are disposed somewhere along the first paper path L1 (more specifically, between the second junction P2 and the secondary transfer roller 8), in which the purpose of the resist roller pair 80 is skew compensation of the sheet of paper T, and timing adjustment between the forming of the toner image in the image forming unit GK and the feeding of the sheet of paper T. The sensor is disposed immediately anterior to the resist rollers pair 80 in the feeding direction of the sheet of paper T (on the upstream side in the feeding direction). The resist roller pair 80 is a pair of rollers that feed the sheet of paper T by performing the correction or the timing adjustment based on detection signal information from the sensor.

The reverse paper path Lb is a paper path that is provided for reversing the sheet of paper T such that an unprinted surface, which is opposite to a printed surface, faces the intermediate transfer belt 7, when performing duplex printing of the sheet of paper T. The reverse paper path Lb can reverse the sheet of paper T, which has been fed from the first branch portion Q1 toward the ejection portion 50 side, return the sheet of paper T to the first paper path L1, and fed the sheet of paper T to an upstream side of the resist roller pair 80 disposed on an upstream side of the secondary transfer roller 8. In the secondary transfer nip N2, a predetermined toner image is transferred to the unprinted surface of the sheet of paper T that has been reversed by the reverse paper path Lb.

The first ejection portion 50a is formed at an end of the third paper path L3. The first ejection portion 50a is disposed on an upper side of the apparatus main body M. The first ejection portion 50a is open toward the right lateral face side of the apparatus main body M (the right side or the manual feeding portion 64 side in FIG. 1). The first ejection portion 50a ejects the sheet of paper T, which is fed through the third paper path L3, to the outside of the apparatus main body M.

An ejected paper accumulating portion M1 is formed on an opening side of the first ejection portion 50a. The ejected paper accumulating portion M1 is formed on an upper face (external face) of the apparatus main body M. The ejected paper accumulating portion M1 is a portion that is formed by downwardly recessing the upper face of the apparatus main body M. A bottom face of the ejected paper accumulating portion M1 composes a part of the upper face of the apparatus main body M. After predetermined toner images are formed on the sheets of paper T, the sheets of paper T are ejected from the first ejection portion 50a, and are stacked and accumulated in the ejected paper accumulating portion M1.

The second ejection portion 50b is formed at an end of the post-processing paper path Lc. The second ejection portion 50b is disposed on an upper side of the apparatus main body M. The second ejection portion 50b is open toward a left lateral face side of the apparatus main body M (the left side in FIG. 1; a side where a post-processing device is connected to).

The second ejection portion 50b ejects the sheet of paper T, which is fed through the post-processing paper path Lc, to the outside the apparatus main body M. A post-processing device (not illustrated) is connected at an opening side of the second ejection portion 50b. The post-processing device performs post-processing (stapling, punching, etc.) on a sheet of paper ejected from the image forming apparatus (copy machine 1).

It should be noted that a sensor for detecting a sheet of paper is disposed at a predetermined position in each paper path.

Next, brief descriptions are provided for a structure for eliminating paper jams in the main paper paths L1 to L3 (the first paper path L1, the second paper path L2 and the third paper path L3 are also collectively referred to as the "main paper paths" hereinafter) and in the reverse paper path Lb.

As shown in FIG. 1, the main paper paths L1 to L3 and the reverse paper path Lb are aligned so as to extend primarily in the vertical direction on the left lateral face side of the apparatus main body M (the left side in FIG. 1). A cover body 40 is provided to the left lateral face side of the apparatus main body M (the left side in FIG. 1) such that the cover body 40 forms a part of the lateral face of the apparatus main body M. The cover body 40 is connected at a lower end thereof to the apparatus main body M via a fulcrum shaft 43. The fulcrum shaft 43 is disposed such that an axial direction of the fulcrum shaft 43 intersects the main paper paths L1 to L3 and the reverse paper path Lb. The cover body 40 is configured to be pivotable between a closed position (position shown in FIG. 1) and an opened position (not illustrated) about the fulcrum shaft 43.

The cover body 40 is configured to include: a first cover portion 41 pivotably connected to the apparatus main body M via the fulcrum shaft 43; and a second cover portion 42 pivotably connected to the apparatus main body M via the same fulcrum shaft 43. The first cover portion 41 is positioned more towards the outside (the lateral face side) of the apparatus main body M than the second cover portion 42. It should be noted that, in FIG. 1, the portion hatched by falling diagonal broken lines from top right to bottom left is the first cover portion 41, and the portion hatched by falling diagonal broken lines from top left to bottom right is the second cover portion 42.

In a state where the cover body 40 is in the closed position, the outer face side of the first cover portion 41 forms a part of the outer face (the lateral face) of the apparatus main body M.

In addition, in a state where the cover body 40 is in the closed position, the inner face side (the apparatus main body M side) of the second cover portion 42 forms a part of the main paper paths L1 to L3.

Furthermore, in a state where the cover body 40 is in the closed position, the inner face side of the first cover portion 41 and the outer face side of the second cover portion 42 compose at least a part of the reverse paper path Lb. In other words, the reverse paper path Lb is formed between the first cover portion 41 and the second cover portion 42.

Since the copy machine 1 according to the present embodiment is provided with the cover body 40 thus configured, in a case in which a paper jam occurs in the main paper paths L1 to L3, the cover body 40 pivots from the closed position shown in FIG. 1 to the opened position (not illustrated), and a jammed sheet of paper in the main paper paths L1 to L3 can be removed by opening the main paper paths L1 to L3. On the other hand, in a case in which a paper jam occurs in the reverse paper path Lb, the reverse paper path Lb opens by pivoting the cover body 40 to the opened position, thereafter the second cover portion 42 pivots about the fulcrum shaft 43 toward the apparatus main body M side (the right side in FIG. 1) to release the reverse paper path Lb, and a jammed sheet of paper in the reverse paper path Lb can be removed.

Next, with reference to FIGS. 2 to 11D, descriptions are provided for a light emitting unit 400 that composes the image reading device 300.

Figure 2:
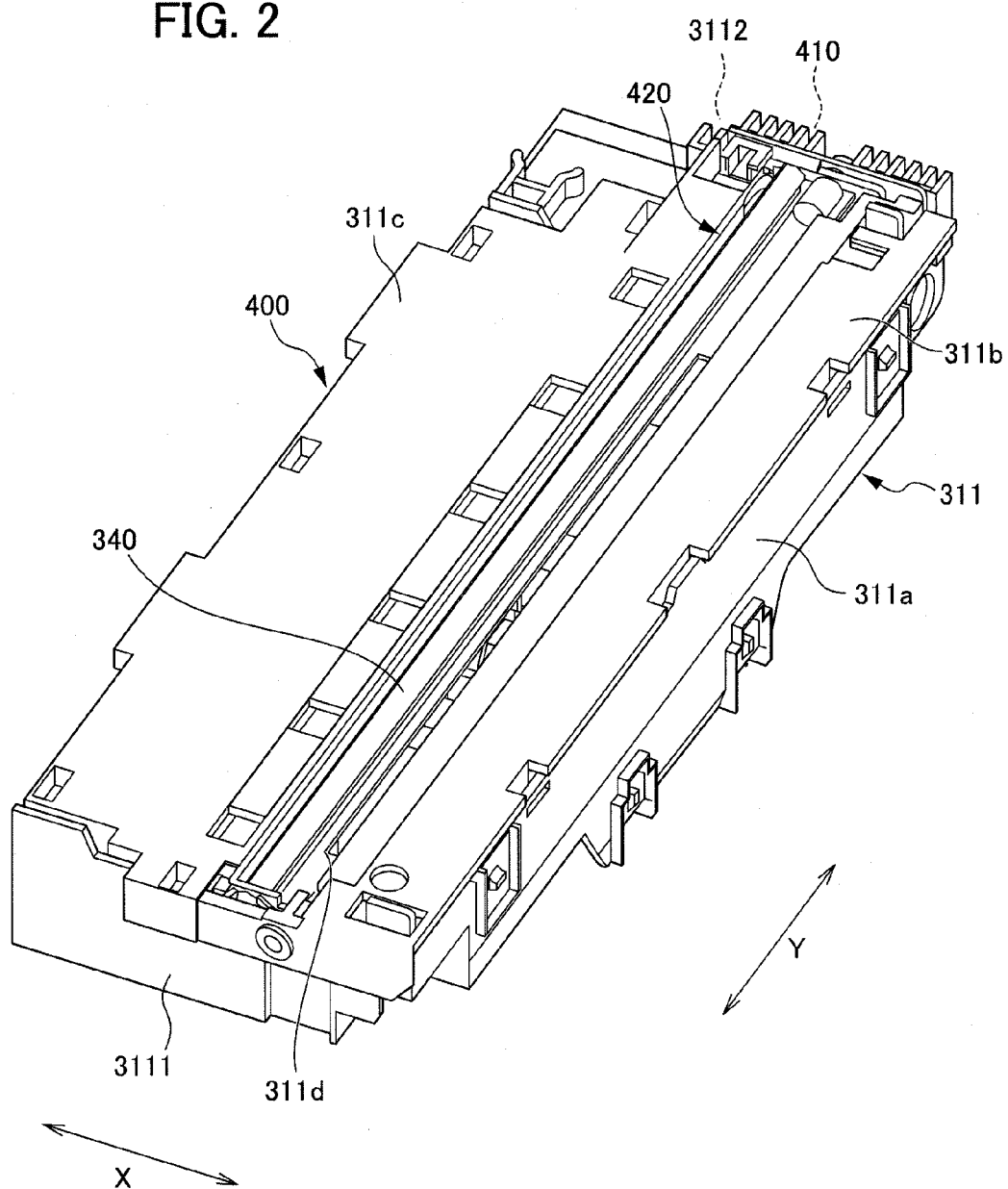
FIG. 2 is a perspective view of a light emitting unit 400 that is incorporated into an image reading device 300.
Figure 3:
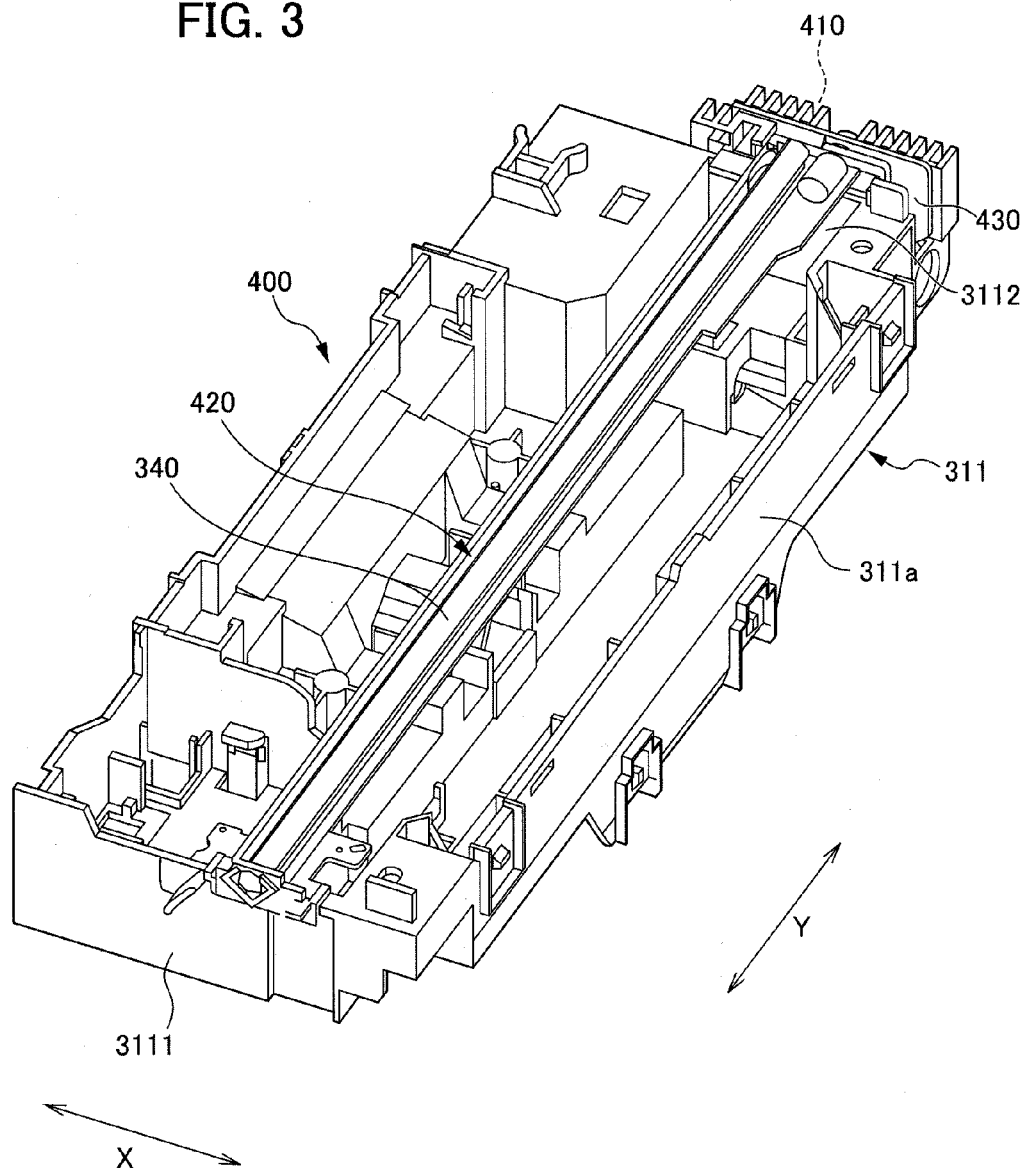
FIG. 3 is a perspective view of the light emitting unit 400, in which a cover member 311b and a cover member 311c are removed from the state shown in FIG. 2.
Figure 4:
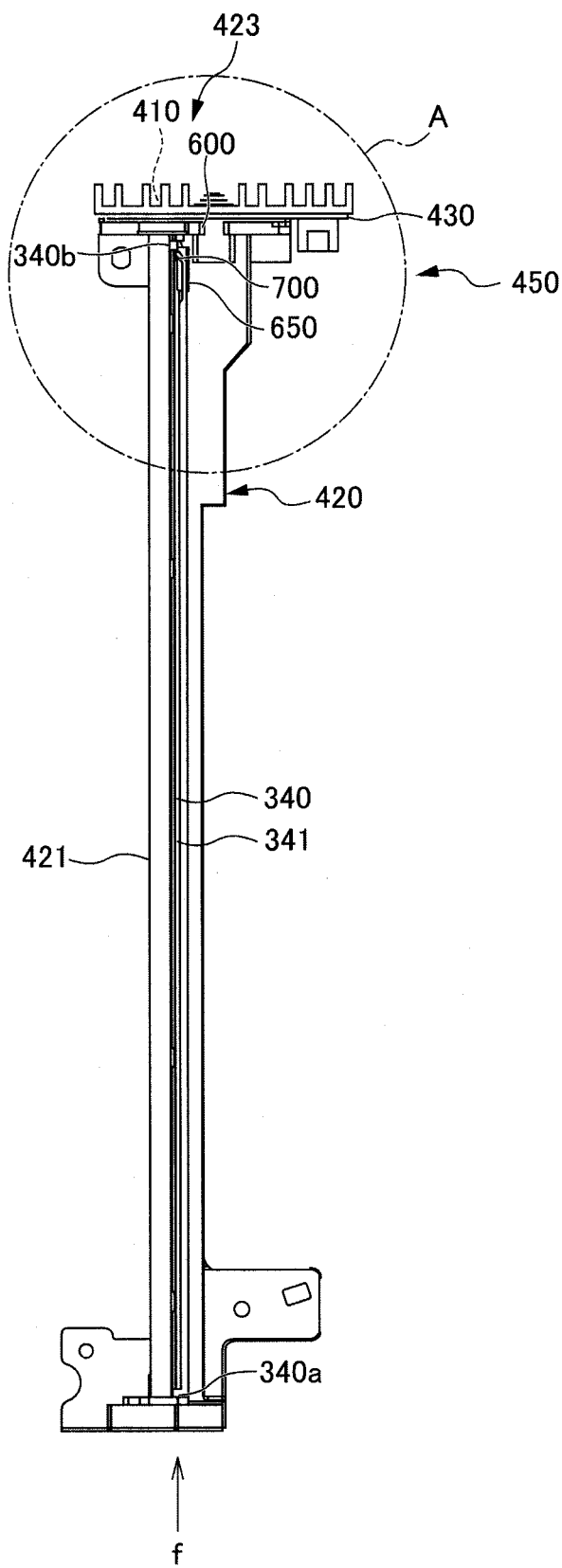
FIG. 4 is a plan view of a holding member 420 in a state where a light guiding member 340 and an LED substrate 430 are held thereon.
Figure 5:
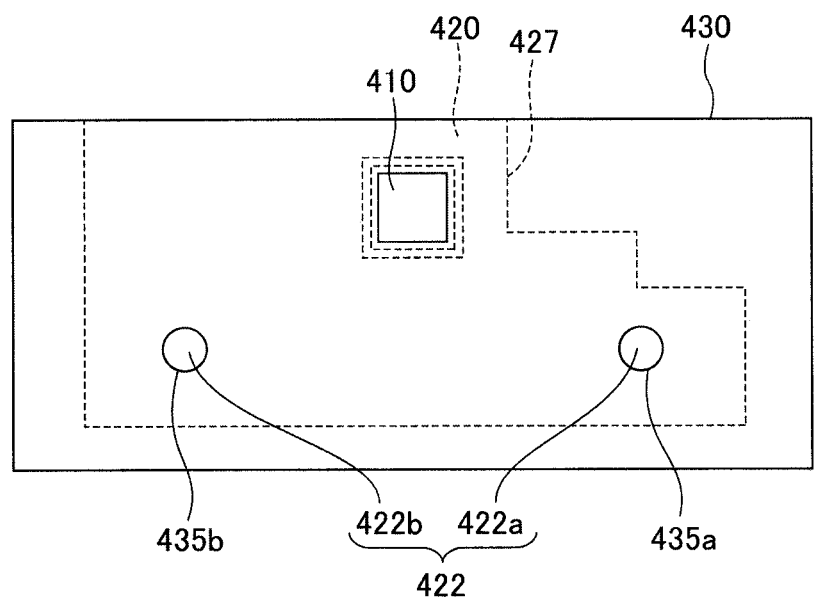
FIG. 5 is a diagram for illustrating a positioning structure for a tip end member 427 of the holding member 420 and the LED substrate 430.
Figure 6:
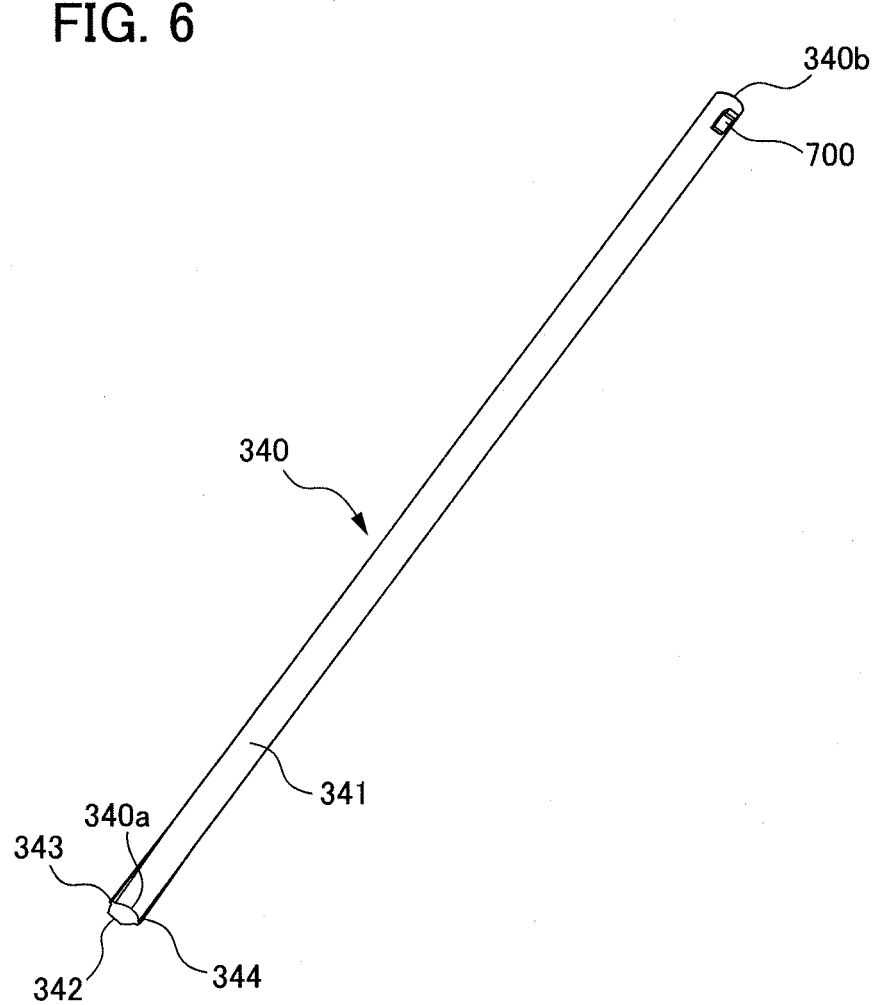
FIG. 6 is a perspective view of the light guiding member 340.
Figure 7:
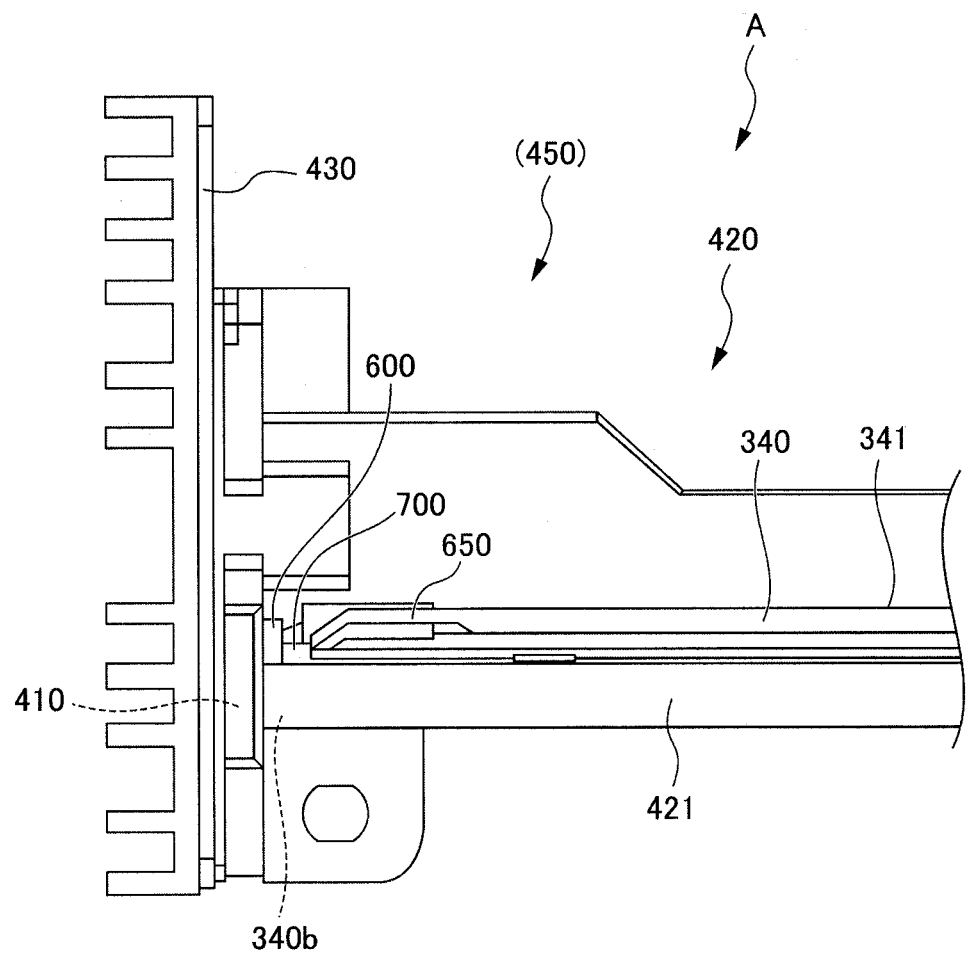
FIG. 7 is a partial enlarged view of an area A shown in FIG. 4.
Figure 8:
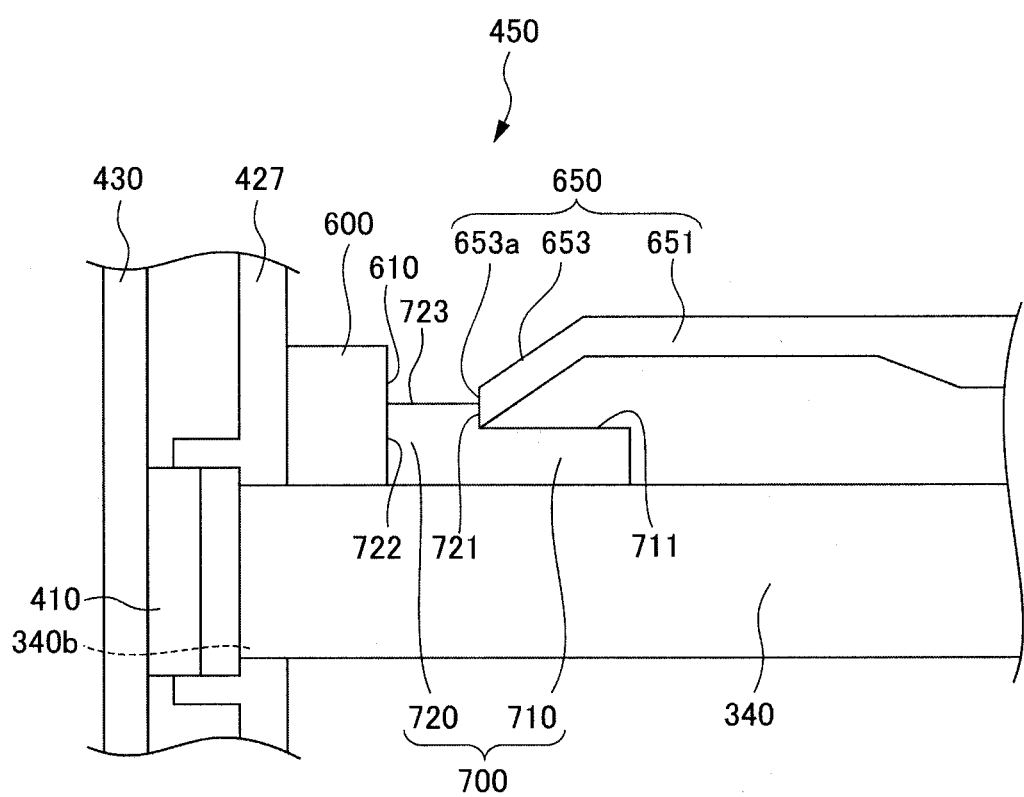
FIG. 8 is a diagram for illustrating a positioning structure for the light guiding member 340.
Figure 9:
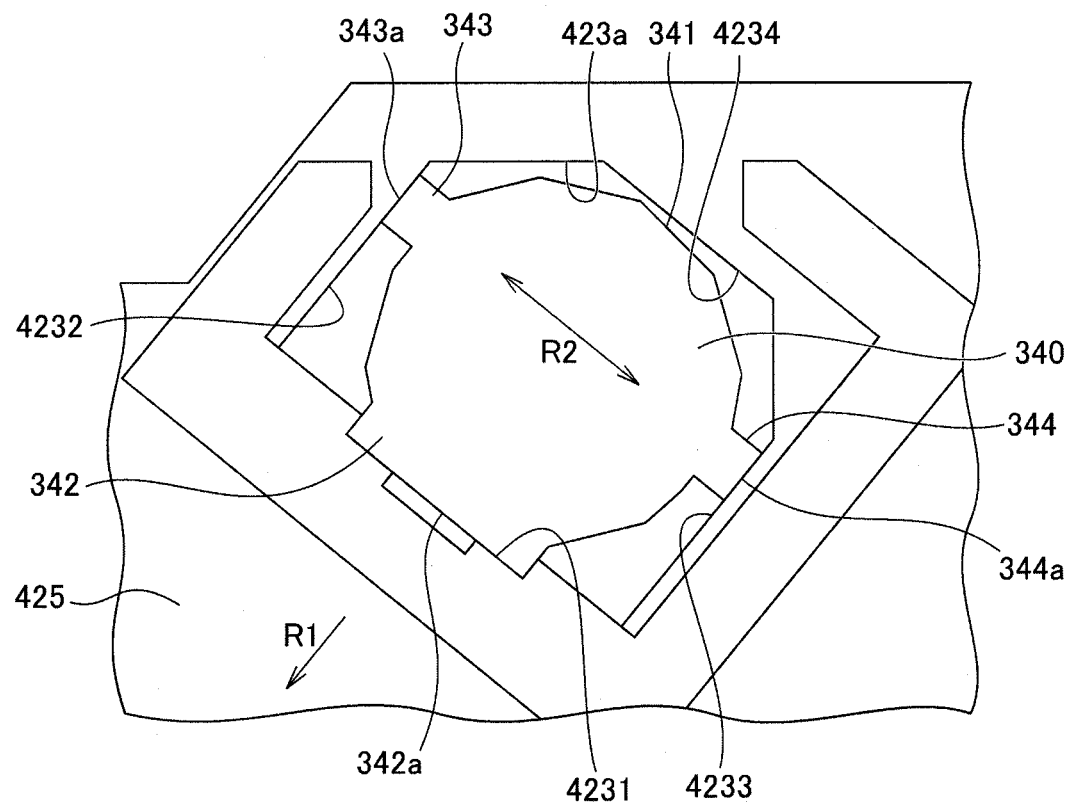
FIG. 9 is a diagram for illustrating a positioning structure for a base end hole portion 423a that is formed in a base end member 425 of the holding member 420, and for a base end portion of the light guiding member 340.
Figure 10:
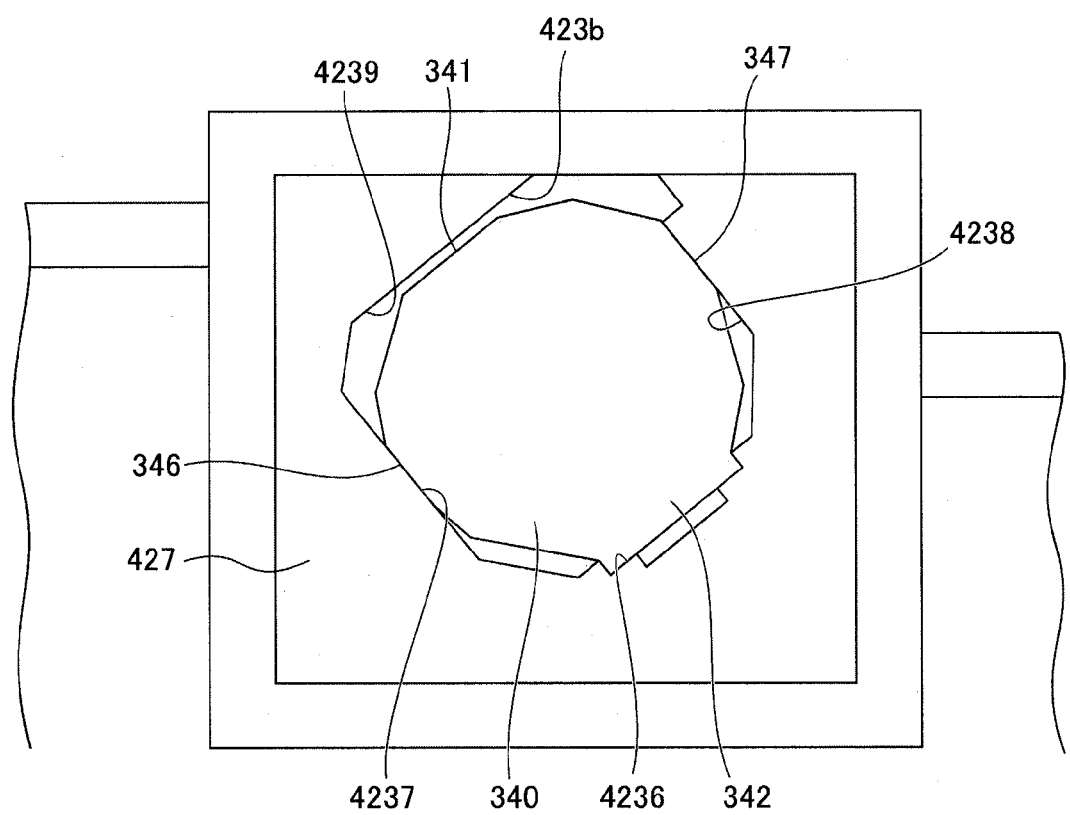
FIG. 10 is a diagram for illustrating a positioning structure for a tip end hole portion 423b that is formed in the tip end member 427 of the holding member 420, and for a tip end portion of the light guiding member 340.
Figure 11A:
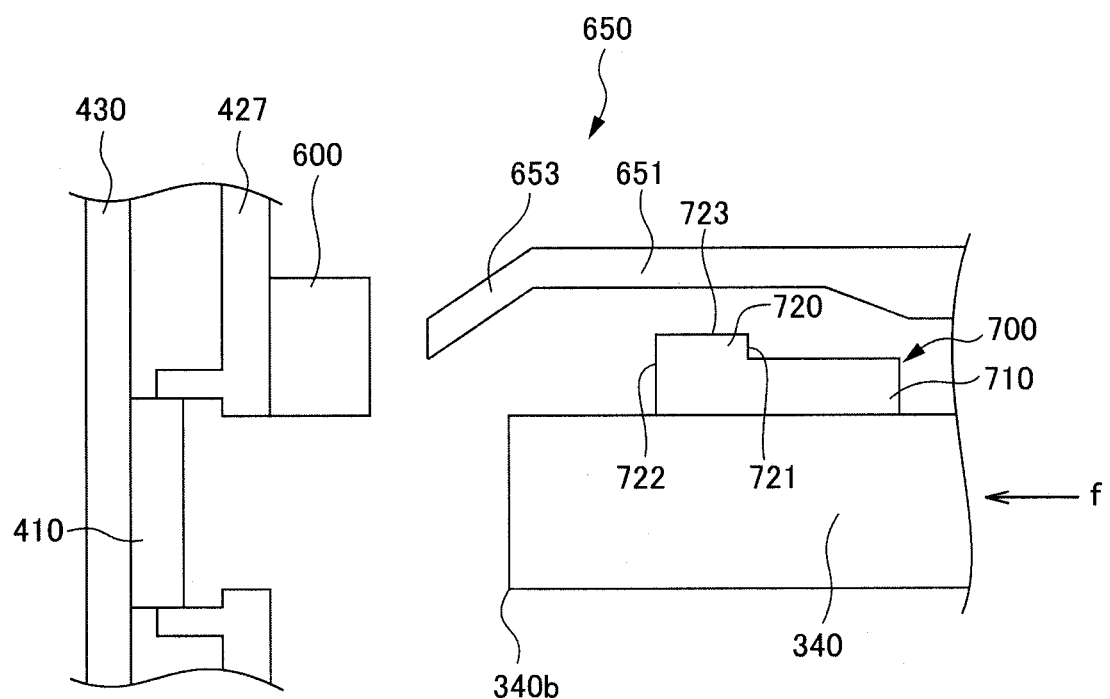
FIG. 11A is a diagram for illustrating a procedure for attaching the light guiding member 340.
Figure 11B:
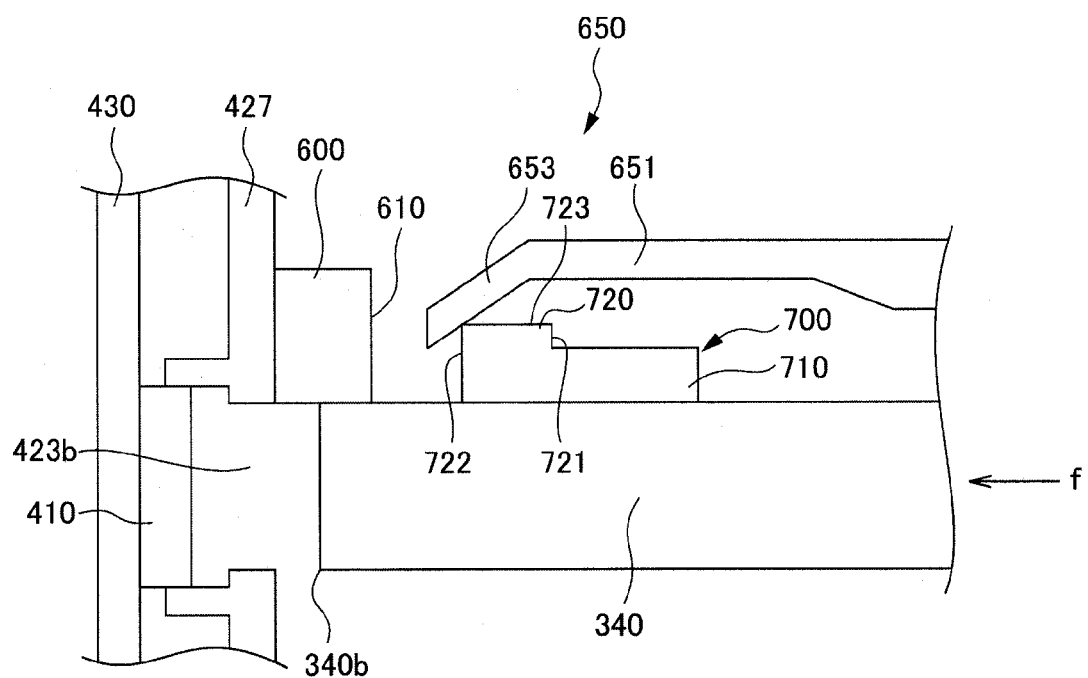
FIG. 11B is a diagram for illustrating the procedure for attaching the light guiding member 340.
Figure 11C:
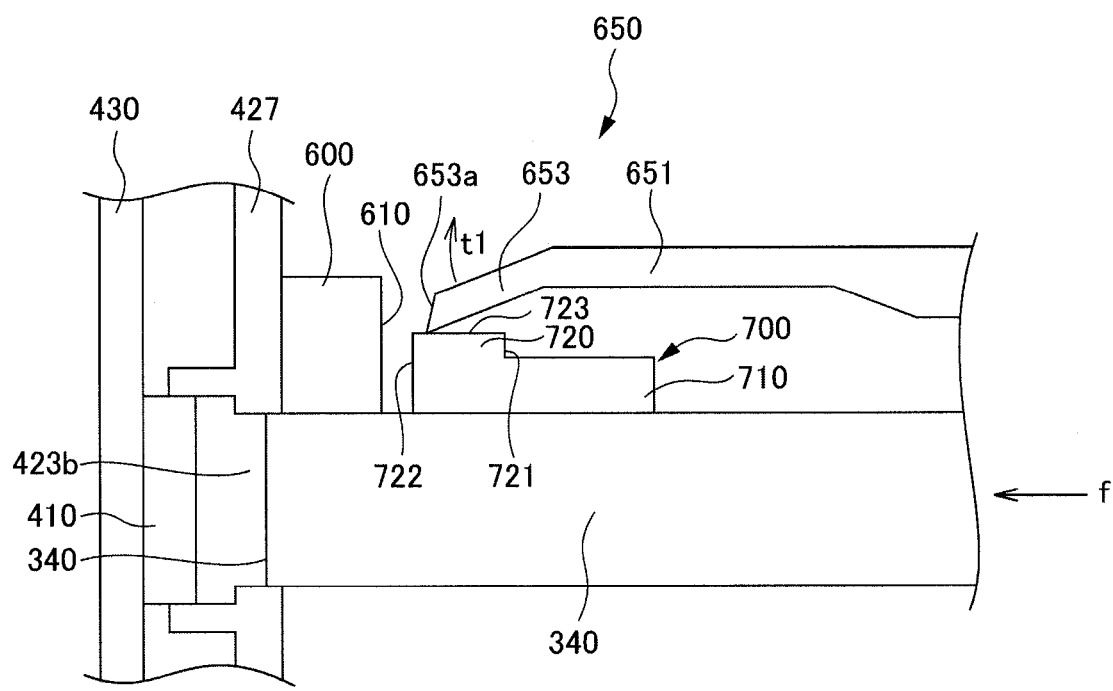
FIG. 11C is a diagram for illustrating the procedure for attaching the light guiding member 340.
Figure 11D:
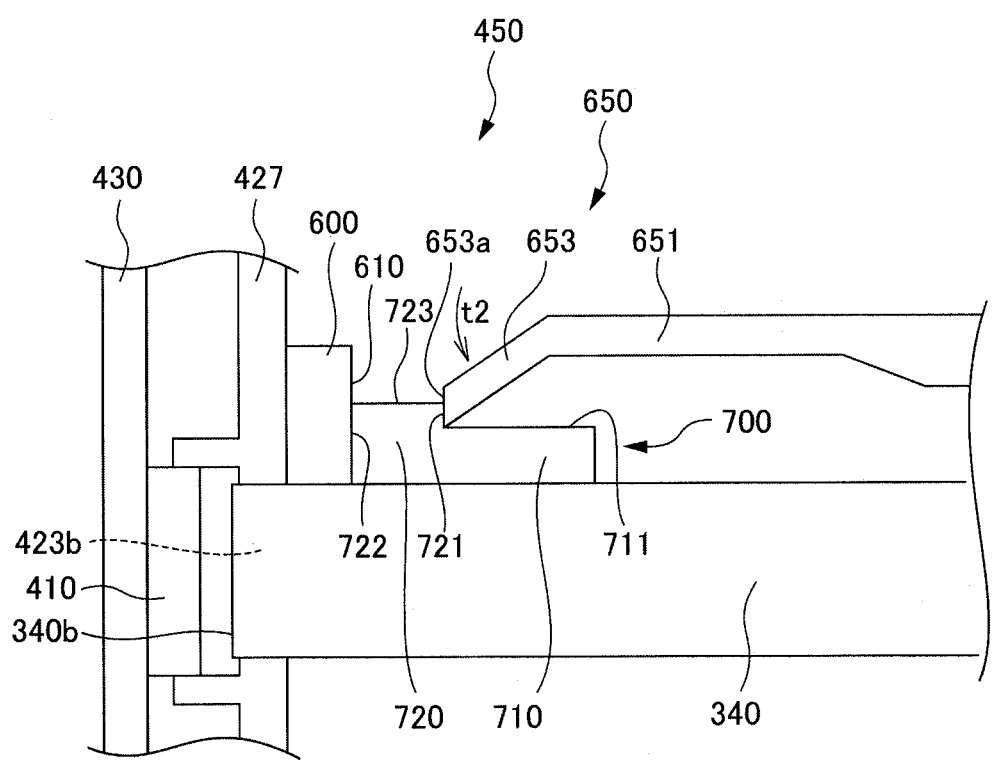
FIG. 11D is a diagram for illustrating the procedure for attaching the light guiding member 340.

FIG. 2 is a perspective view of the light emitting unit 400 that is incorporated into the image reading device 300. FIG. 3 is a perspective view of the light emitting unit 400, in which a cover member 311b and a cover member 311c are removed from the state shown in FIG. 2. FIG. 4 is a plan view of a holding member 420 in a state where a light guiding member 340 and an LED substrate 430 are held thereon. FIG. 5 is a diagram for illustrating a positioning structure for a tip end member 427 of the holding member 420 and the LED substrate 430. FIG. 6 is a perspective view of the light guiding member 340. FIG. 7 is a partial enlarged view of an area A shown in FIG. 4. FIG. 8 is a diagram for illustrating a positioning structure for the light guiding member 340. FIG. 9 is a diagram for illustrating a positioning structure for a base end hole portion 423a that is formed in a base end member 425 of the holding member 420, and for a base end portion of the light guiding member 340. FIG. 10 is a diagram for illustrating a positioning structure for a tip end hole portion 423b that is formed in the tip end member 427 of the holding member 420, and for a tip end portion of the light guiding member 340. FIG. 11A is a diagram for illustrating a procedure for attaching the light guiding member 340. FIG. 11B is a diagram for illustrating the procedure for attaching the light guiding member 340. FIG. 11C is a diagram for illustrating the procedure for attaching the light guiding member 340. FIG. 11D is a diagram for illustrating the procedure for attaching the light guiding member 340.

The light emitting unit 400 includes: an LED 410 as a light emitting portion (see FIG. 5); the light guiding member 340; the holding member 420; and a first frame body 311 as a case member for housing the holding member 420 in a state of being positioned in a predetermined position.

As shown in FIGS. 2 and 3, the first frame body 311 includes: a body frame 311a with a substantially box-like shape having an open top portion; and the two cover members 311b and 311c that cover the open top portion of the body frame 311a.

As shown in FIG. 2, the cover member 311b and the cover member 311c are attached to the top portion of the body frame 311a so as to be separated in a sub scanning direction X, such that an opening 311d that extends along a main scanning direction Y is formed in a top face of the first frame body 311.

The opening 311d is an opening that exposes the light guiding member 340 fixed to the body frame 311a via the holding member 420. The opening 311d is an opening for not shielding the light emitted from the light guiding member 340, but for irradiating the first reader surface 302A or the second reader surface 3028 with the light.

As shown in FIG. 3, the body frame 311a has outer wall portions 3111 and 3112 that are disposed on both outer sides so as to face each other in the main scanning direction Y.

The holding member 420 is placed and held in a state of being positioned on the top face of the outer wall portion 3111 and the outer wall portion 3112.

Here, the outer wall portion 3111 is a portion corresponding to a base end side of the holding member 420. Moreover, the outer wall portion 3112 is a portion corresponding to a tip end side of the holding member 420.

More specifically, a positioning pin (not illustrated) is provided on the outer wall portion 3111, and is engaged with the base end side of the holding member 420.

The base end side of the holding member 420 is placed on the outer wall portion 3111, and the positioning pin is fitted into a positioning hole (not illustrated) that is formed in the base end member 425 that is disposed on the base end side of the holding member 420. As a result, the base end side of the holding member 420 is positioned in (engaged with) a predetermined position on the outer wall portion 3111 of the body frame 311a.

Moreover, a positioning protrusion (not illustrated) is provided on the outer wall portion 3112, and is engaged with the tip end side of the holding member 420.

The tip end side of the holding member 420 is placed on the outer wall portion 3112, and the positioning protrusion is fitted into a notch portion (not illustrated) that is formed in the tip end member 427 that is disposed on the tip end side of the holding member 420. As a result, the tip end side of the holding member 420 is positioned in a predetermined position of the outer wall portion 3112 of the body frame 311a.

The tip end side of the holding member 420 is positioned in (engaged with) the predetermined position of the outer wall portion 3112 of the body frame 311a.

As described above, the holding member 420 is attached in a state of being positioned to the body frame 311a.

Here, as shown in FIG. 4, the light guiding member 340 and the LED substrate 430 (LED 410) are positioned to the holding member 420 with a predetermined positional relationship. In addition, as a result of the holding member 420 being positioned and held to the body frame 311a, the light guiding member 340 and the LED 410, which are positioned to the holding member 420, are positioned in predetermined positions.

Next, descriptions are provided in detail for the LED 410, the LED substrate 430, the light guiding member 340 and the holding member 420. More specifically, descriptions are provided for an attachment structure, in which the light guiding member 340 is attached to the holding member 420.

The LED 410 is an LED (Light Emitting Diode) that functions as the light emitting portion. In the present embodiment, the LED 410 is singular.

The LED 410 is disposed on a tip end 340b side of the light guiding member 340. More specifically, the LED 410 is disposed such that a light emitting face thereof faces an end face of the tip end 340b of the light guiding member 340. The LED 410 emits light toward the end face of the tip end 340b.

As shown in FIG. 5, the LED 410 is mounted on the LED substrate 430.

The LED substrate 430 is positioned and held in a predetermined position (a predetermined orientation) in the holding member 420 by way of an LED substrate holding portion 422 that is formed on an end side of the holding member 420.

As shown in FIG. 5, the LED substrate holding portion 422 has a pair of positioning protrusions 422a and 422b. The positioning protrusions 422a and 422b are provided in a protruding manner on an outer surface of the tip end member 427 that is shaped like a plate.

The positioning protrusions 422a and 422b are protrusions that are inserted into positioning holes 435a and 435b of the LED substrate 430. The positioning protrusions 422a and 422b are fitted into the positioning holes 435a and 435b of the LED substrate 430, thereby positioning the LED 410 mounted on the LED substrate 430 such that the light emitting face thereof faces the end face on the tip end 340b side of the light guiding member 340 in the main scanning direction Y.

The positioning protrusions 422a and 422b (the LED substrate holding portion 422) indirectly position and hold the LED 410 via the LED substrate 430.

As shown in FIG. 2. the light guiding member 340 is a stick-like light guiding member that is disposed along the main scanning direction Y. As shown in FIGS. 9 and 10, a cross-sectional shape of the light guiding member 340 is shaped as being substantially polygonal. The light guiding member 340 is a light guiding member that is composed of acrylic resin or the like.

A light guiding member holding mechanism 450 (holding portion) positions and holds the light guiding member 340 to the holding member 420, such that an end portion on the tip end 340b side (the end portion side on the LED 410 side) does not move in the main scanning direction Y, but another end portion on a base end 340a side (a side opposite to the LED 410 (the light emitting portion)) can move in the main scanning direction Y.

More specifically, the tip end 340b is positioned and held to the light guiding member holding portion 423 (the tip end hole portion 423b) that is formed in the holding member 420, and the base end 340a is positioned and held to the light guiding member holding portion 423 (the base end hole portion 423a), and as a result, the light guiding member 340 is positioned and held to the holding member 420. In a case in which the light guiding member 340 is held in this way only, the light guiding member 340 is completely restricted from rotationally moving, but is not completely restricted from moving in the main scanning direction Y. The light guiding member 340 is held to the holding member 420 so as to be capable of moving toward either direction in the main scanning direction Y in a case in which a predetermined force is applied to the light guiding member 340, and in a case in which the light guiding member 340 thermally expands. In particular, in a case in which the light guiding member 340 expands in the main scanning direction Y due to thermal expansion, the light guiding member 340 can expand (an end portion thereof can move) toward either direction in the main scanning direction Y.

Furthermore, a first movement restricting portion 600 and a second movement restricting portion 650 (to be described later) abut a restricted portion 700 (to be described later), and as a result, the end portion on the tip end 340b side of the light guiding member 340 is restricted from moving in the main scanning direction Y.

The light guiding member 340 is held to the holding member 420, in a state where the end portion on the tip end 340b side is restricted from moving toward the LED 410 side, and the end portion on the base end 340a side is not restricted from moving toward the side opposite to the LED 410 side.

In this state, in a case in which the light guiding member 340 thermally expands due to the heat from the LED 410, the end portion on the base end 340a side moves toward the side opposite to the LED 410 side, but the end portion on the tip end 340b side does not move, and as a result, the positional relationship with (the distance from) the LED 410 is maintained.

Moreover, specific configurations of the light guiding member 340 are as follows.

An end face on the tip end 340b side of the light guiding member 340 is disposed to face the light emitting face of the LED 410.

The light guiding member 340 guides light, which is emitted from the LED 410 disposed on the tip end 340b side, in a longitudinal direction (the main scanning direction) of the light guiding member 340, and guides the light to a light irradiating portion 341 (to be described later).

The light guiding member 340 has the light irradiating portion 341 that is formed in a part of the outer periphery along the main scanning direction Y. The light irradiating portion 341 is a portion for emitting internally-guided light to the outside.

The light irradiating portion 341 is disposed in a predetermined direction, such that the first reader surface 302A or the second reader surface 302B can be irradiated with light H, in a state where the light guiding member 340 is held to the first frame body 311 via the holding member 420.

Moreover, as shown in FIG. 6, the light guiding member 340 has convex portions 342, 343 and 344 that are formed on the outer circumference so as to extend along the longitudinal direction (the main scanning direction Y). The purpose of the convex portions 342, 343 and 344 is to prevent the light guiding member 340 from being attached in a wrong orientation when the light guiding member 340 is held to the holding member 420.

As shown in FIG. 9, the convex portion 342 is formed on the outer periphery on a side substantially opposite to (in a position facing) the light irradiating portion 341.

As shown in FIG. 10, the convex portion 342 is formed on the light guiding member 340 over the entire area thereof in the longitudinal direction. A tip face 342a of the convex portion 342 is a flat face that is orthogonal to a protruding direction (a direction indicated by an arrow R1 in FIG. 9) of the convex portion 342.

The convex portion 343 and the convex portion 344 are formed on the outer periphery between the light irradiating portion 341 and the convex portion 342. The convex portion 343 and the convex portion 344 are formed in positions facing each other. As shown in FIG. 9, a protruding direction of the convex portion 343 and the convex portion 344 is a direction (a direction indicated by an arrow R2) that is orthogonal to the protruding direction (the direction indicated by the arrow R1) of the convex portion 342.

As shown in FIG. 6, the convex portions 343 and 344 are formed on the base end 340a side of the light guiding member 340.

More specifically, the convex portions 343 and 344 are formed only in a predetermined range of length from the base end 340a, and are not formed on the tip end 340b side.

In addition, each of the convex portions 343 and 344 has a tapered ridge structure, in which a protruding length in a radial direction of the light guiding member 340 gradually decreases as a distance from the base end 340a increases. Moreover, a tip face 343a of the convex portion 343 and a tip face 344a of the convex portion 344 are flat faces that are orthogonal to the protruding direction (the direction indicated by the arrow R2) shown in FIG. 9.

With reference to FIGS. 7 and 8, the light guiding member 340 has the restricted portion 700 (protrusion) on the tip end 340b side (the end portion side on the LED 410 side) in the main scanning direction Y, and the light guiding member 340 protrudes in a direction orthogonal to the main scanning direction Y.

The restricted portion 700 is formed on the tip end 340b side of the light guiding member 340.

The restricted portion 700 has a first portion 710 and a second portion 720 that is formed continuously to the first portion 710 on the LED 410 side.

The first portion 710 is a portion that is formed continuously to the second portion 720, on a side opposite to the LED 410 side of the second portion 720.

A protruding volume (protruding length) of the first portion 710 in a direction orthogonal to the main scanning direction Y is smaller (shorter) than that of the second portion 720.

In a state where the light guiding member 340 is positioned and held in a predetermined position, the second movement restricting portion 650 (to be described later) is placed on a first top face 711 of the first portion 710.

The second portion 720 is a portion that is formed continuously to the first portion 710, on the LED 410 side of the first portion 710.

A protruding volume (protruding length) of the second portion 720 in the direction orthogonal to the main scanning direction Y is larger (longer) than that of the first portion 710.

The second portion 720 is a portion that is abutted by the first movement restricting portion 600 (a first abutting portion) formed in the holding member 420, and by the second movement restricting portion 650 (a second abutting portion).

The second portion 720 has a first abutted face 722, a second abutted face 721 and a second top face 723.

The first abutted face 722 is a face that is formed on the LED 410 side of the second portion 720 in the main scanning direction Y. The first abutted face 722 is a face that is abutted by an abutting face 610 of the first movement restricting portion 600 (to be described later).

The second abutted face 721 is a face that is formed on a side opposite to the LED 410 side in the main scanning direction Y of the second portion 720. The second abutted face 721 is a face that is abutted by a tip end portion 653 (a tip end abutting face 653a) of the second movement restricting portion 650 (to be described later).

The second top face 723 is an end face in a direction orthogonal to the main scanning direction Y of the second portion 720, and is a face that is formed continuously to the first abutted face 722 and the second abutted face 721.

The second top face 723 is a face that is abutted (slid on) by the tip end portion 653 (an outer edge of the tip end abutting face 653a) of the second movement restricting portion 650 during the step of attaching when the light guiding member 340 is attached to the holding member 420.

As described above, the first abutted face 722 of the second portion 720 is abutted by the first movement restricting portion 600, and the second abutted face 721 of the second portion 720 is abutted by the second movement restricting portion 650; as a result, movement is restricted in the end portion on the tip end 340b side of the light guiding member 340.

As a result, the light guiding member 340 is held to the holding member 420 in a state where a distance between the end face of the tip end 340b and the LED 410 is maintained constant.

As shown in FIGS. 4 and 5, the holding member 420 has a light reflecting portion 421, the LED substrate holding portion 422, and the light guiding member holding mechanism 450 (a holding portion). The holding member 420 is a member that positions and holds the LED 410 and the light guiding member 340 in predetermined positions and orientations.

The light reflecting portion 421 is a member that is disposed to face the outer periphery that is opposite to the light irradiating portion 341 side of the light guiding member 340. The light reflecting portion 421 is disposed to face the light guiding member 340 over the entire area thereof in the longitudinal direction (the main scanning direction Y).

The light reflecting portion 421 has an inner face that faces the outer circumference of the light guiding member 340. The inner face is a reflecting surface that reflects light. When light is emitted from the outer periphery of the light guiding member 340 toward the inner face (the light is leaked from the light guiding member 340), the inner face reflects the light toward the light guiding member 340. When the light is leaked from the light guiding member 340, the inner face reflects the light in the same direction as a direction of the light outgoing from the light irradiating portion 341, thereby improving the irradiation efficiency of the light guiding member 340.

As shown in FIG. 5, the LED substrate holding portion 422 has the pair of positioning protrusions 422a and 422b formed on the tip end member 427.

The positioning protrusions 422a and 422b are inserted into the positioning holes 435a and 435b of the LED substrate 430, thereby positioning and holding the LED substrate 430.

The positioning protrusions 422a and 422b (the LED substrate holding portion 422) position and hold the LED 410 via the LED substrate 430, in a state where the LED 410 mounted on the LED substrate 430 faces the end face on the tip end 340b side of the light guiding member 340.

The light guiding member holding mechanism 450 has the light guiding member holding portion 423, the first movement restricting portion 600 and the second movement restricting portion 650.

The light guiding member holding mechanism 450 disposes the light guiding member 340 along the main scanning direction Y, and positions and holds the end portion on the tip end 340b side in the main scanning direction Y.

The light guiding member holding mechanism 450 positions and holds the light guiding member 340, such that the end portion of the tip end 340b does not move in the main scanning direction Y, and the end portion on the base end 340a side (a side opposite to the light emitting portion) can move in the main scanning direction Y.

The light guiding member holding portion 423 is configured to include the base end hole portion 423a and the tip end hole portion 423b.

The base end hole portion 423a fits onto the base end 340a side of the light guiding member 340, and the tip end hole portion 423b fits onto the tip end 340b side of the light guiding member 340; in this way, the light guiding member holding portion 423 positions and holds the light guiding member 340.

The base end hole portion 423a is a substantially hexagonal through-hole that is formed in the base end member 425 of the holding member 420.

As shown in FIG. 9, the base end hole portion 423a includes: a guiding groove 4231 into which is slidably fitted by the convex portion 342 of the light guiding member 340 in the main scanning direction Y; a first flat edge 4232 that is slidably in surface contact with the tip face 343a of the convex portion 343 in the main scanning direction Y; a second flat edge 4233 that is slidably in surface contact with the tip face 344a of the convex portion 344 in the main scanning direction Y; and a contactless edge 4234 that faces the guiding groove 4231 in the inner circumference edge, and is not in contact with the outer periphery of the light guiding member 340.

The base end hole portion 423a positions the base end 340a of the light guiding member 340, in a state where rotation thereof and movement thereof in the main scanning direction Y are restricted by: fitting the convex portion 343 into the guiding groove 4231; surface contact of the first flat edge 4232 with the convex portion 342; and surface contact of the second flat edge 4233 with the convex portion 344.

Here, the guiding groove 4231 guides movement of the light guiding member 340, and achieves a function of suppressing the light guiding member 340 from being inserted in a manner different from the original manner (at a different rotation angle).

As shown in FIG. 10, the tip end hole portion 423b is a substantially tetragonal through-hole that is formed in the tip end member 427 of the holding member 420.

As shown in FIG. 10, the tip end hole portion 423b includes: a guiding groove 4236 into which is slidably fitted by the convex portion 342 of the light guiding member 340 in the main scanning direction Y; a third flat edge 4237 that is slidably in surface contact with a first outer circumferential plane 346 forming the outer circumference of light guiding member 340 in the main scanning direction Y; a fourth flat edge 4238 that is slidably in surface contact with a second outer circumferential plane 347 facing the first outer circumferential plane 346 in the main scanning direction Y; and a contactless edge 4239 that faces the guiding groove 4236, and is not in contact with the outer periphery of the light guiding member 340.

The tip end hole portion 423b positions the tip end 340b of the light guiding member 340, in a state where rotation thereof and movement thereof in the main scanning direction Y are restricted by: fitting the convex portion 342 into the guiding groove 4236; surface contact of the third flat edge 4237 with the first outer circumferential plane 346; and surface contact of the fourth flat edge 4238 with the second outer circumferential plane 347.

The first movement restricting portion 600 and the second movement restricting portion 650 are formed in positions corresponding to the tip end 340b side of the light guiding member 340 in the holding member 420.

The first movement restricting portion 600 is a portion that abuts the LED 410 side of the restricted portion 700 in the main scanning direction Y. Moreover, the second movement restricting portion 650 is a portion that abuts the side opposite to the LED 410 side of the restricted portion 700 in the main scanning direction Y.

The first movement restricting portion 600 is a restricting portion that restricts the tip end 340b of the light guiding member 340 from moving toward the LED 410 side in the main scanning direction Y. In addition, the second movement restricting portion 650 is a restricting portion that restricts the tip end 340b of the light guiding member 340 from moving toward the side opposite to the LED 410 side in the main scanning direction Y.

The first movement restricting portion 600 is formed so as to protrude from the tip end member 427 toward the side opposite to the LED 410 side in the main scanning direction Y.

The first movement restricting portion 600 has the abutting face 610 that is formed on the side opposite to the LED 410 side in the main scanning direction Y.

The abutting face 610 is a face that abuts the first abutted face 722 of the restricted portion 700.

The abutting face 610 abuts the first abutted face 722 of the restricted portion 700 (on the LED 410 side in the main scanning direction Y); as a result, the first movement restricting portion 600 restricts the tip end 340b of the light guiding member 340 from moving toward the LED 410 side.

The second movement restricting portion 650 is formed to extend in the main scanning direction Y, and is a cantilever-like member with a free end on the LED 410 side. The second movement restricting portion 650 is configured such that the free end is separated from the first movement restricting portion 600 at a predetermined distance, and is disposed to face the first movement restricting portion 600. The second movement restricting portion 650 is configured to enable elastic deformation (flexural deformation) thereof such that the free end side is separated from the light guiding member 340.

The second movement restricting portion 650 has a base end portion 651 on the base end side, and the tip end portion 653 on the free end side.

The base end portion 651 is disposed to extend substantially in parallel with the main scanning direction Y, and is a portion that is flexed when the free end is deformed so as to be separated from the light guiding member 340.

The tip end portion 653 is a portion, which is disposed as being slanted such that the free end side thereof approaches the light guiding member 340, and which has the tip end abutting face 653*a* formed on the free end.

The tip end abutting face 653*a* is a face that abuts the second abutted face 721 of the second portion 720 of the restricted portion 700.

The tip end abutting face 653*a* abuts the second abutted face 721 of the restricted portion 700 (on the side opposite to the LED 410 side in the main scanning direction Y); as a result, the second movement restricting portion 650 restricts the tip end 340*b* of the light guiding member 340 from moving toward the side opposite to the LED 410 side.

The second movement restricting portion 650 does not restrict the restricted portion 700 from moving toward the LED 410 side in the main scanning direction Y.

Since the free end is abutted and pressed against by the restricted portion 700 that moves toward the LED 410 side (as a result of movement of the restricted portion 700 toward the LED 410 side), the free end is flexurally deformed so as to be separated from the light guiding member 340 in a direction orthogonal to the main scanning direction Y; therefore, the second movement restricting portion 650 does not restrict (but allows) movement of the restricted portion 700 (the light guiding member 340).

However, the second movement restricting portion 650 restricts the restricted portion 700 from moving toward the side opposite to the LED 410 side in the main scanning direction Y. In other words, the second movement restricting portion 650, which is in a state of abutting the second abutted face 721 of the restricted portion 700, restricts the restricted portion 700 from moving toward the side opposite to the LED 410 side in the main scanning direction Y.

In the present embodiment, the second movement restricting portion 650, which is in a state of being placed on the first top face 711 of the first portion 710 of the restricted portion 700, abuts the second abutted face 721 of the second portion 720.

Here, since the second movement restricting portion 650 is flexurally deformed from an original natural state, the elastic force due to the flexural deformation maintains a state in which the tip end abutting face 653*a* is pressing the second abutted face 721. As a result, the second movement restricting portion 650 abuts the restricted portion 700 in a state where the restricted portion 700 is biased to move toward the first movement restricting portion 600 side.

Consequently, the holding member 420 holds the light guiding member 340 in a state where the end face on the LED 410 side of the light guiding member 340 is separated from the LED 410 at a predetermined distance.

In the present embodiment, the LED 410 is positioned and held to the holding member 420 by the LED substrate holding portion 422 via the LED substrate 430. Moreover, the light guiding member 340 is positioned and held to the holding member 420 by the light guiding member holding mechanism 450.

In other words, the holding member 420 positions and holds the LED 410 and the light guiding member 340.

In addition, the holding member 420 is held and positioned to the body frame 311*a* (the first frame body 311) by the positioning pin (not illustrated) and the positioning protrusion (not illustrated).

As a result, such a simple configuration provides the image reading device 300 (the light emitting unit 400), in which the LED 410 and the light guiding member 340 are positioned with high accuracy.

Next, with references to FIGS. 11A to 11D, descriptions are provided for assembly procedures of the light emitting unit 400.

Firstly, with the tip end 340*b* on the front side, an operator inserts the light guiding member 340 into the base end hole portion 423*a* of the holding member 420. More specifically, the operator inserts the tip end 340*b* into the base end hole portion 423*a* such that the convex portion 342 is fitted into the guiding groove 4231.

Subsequently, the operator further inserts the light guiding member 340 in a direction of an arrow f (see FIG. 4). In addition, the operator fits the tip end 340*b* of the light guiding member 340 into the tip end hole portion 423*b*, and fits the base end 340*a* into the base end hole portion 423*a*.

In particular, when the operator further inserts the light guiding member 340 in the direction of the arrow f in the state shown in FIG. 11A, the end portion of the second portion 720 of restricted portion 700 is abutted by the bottom face of the tip end portion 653 of the second movement restricting portion 650, as shown in FIG. 11B.

Moreover, when the operator further inserts the light guiding member 340 in the direction of the arrow f in the state shown in FIG. 11B, the free end of the second movement restricting portion 650 is flexurally deformed so as to be separated from the light guiding member 340 in a direction of an arrow t1, as shown in FIG. 11C.

In addition, since the second movement restricting portion 650 does not restrict the restricted portion 700 from moving toward the LED 410 side, the light guiding member 340 is moved to the LED 410 side in the main scanning direction Y. The free end of the second movement restricting portion 650 (the outer edge of the tip end abutting face 653*a* of the tip end portion 653) is in a state of being placed on the second top face 723 of the second portion 720 of the restricted portion 700 (in a state of being flexurally deformed). In this state, the light guiding member 340 is further moved toward the LED 410 side.

Furthermore, when the operator further inserts the light guiding member 340 in the direction of the arrow f in the state shown in FIG. 11C, the first abutted face 722 of the second portion 720 of the restricted portion 700 is abutted by the abutting face 610 of the first movement restricting portion 600, as shown in FIG. 11D.

Moreover, the second movement restricting portion 650 is deformed such that the free end moves toward the light guiding member 340 in a direction of an arrow t2. In addition, the free end of the second movement restricting portion 650 is placed on the first top face 711 of the first portion 710, and the tip end abutting face 653*a* abuts the second abutted face 721 of the second portion 720 of the restricted portion 700.

Furthermore, the tip end 340*b* of the light guiding member 340 is fitted into the tip end hole portion 423*b*, and the base end 340*a* is fitted into the base end hole portion 423*a*.

As a result, the light guiding member 340 is held to the holding member 420, in a state where the first movement restricting portion 600 restricts the tip end 340*b* from moving toward the LED 410 side in the main scanning direction Y, and the second movement restricting portion 650 restricts the tip end 340*b* from moving toward the side opposite to the LED 410 side in the main scanning direction Y.

In this state, the base end 340*a* of the light guiding member 340 can move toward the side opposite to the LED 410 side in the main scanning direction Y. In the present embodiment, since the light guiding member 340 is configured such that the tip end 340b side does not move toward the LED 410 side when the light guiding member 340 thermally expands due to heat from the LED 410, the base end 340a side is moved depending on such thermal expansion.

In the present embodiment, the distance between the end face on the tip end 340b side of the light guiding member 340 and the light emitting face of the LED 410 is maintained constant.

As described above, the light guiding member 340 is positioned and held to the holding member 420, in a state where the positional relationship with the light reflecting portion 421 and the orientation of the light irradiating portion 341 have been adjusted.

Subsequently, the operator attaches the LED substrate 430 to the holding member 420. More specifically, the operator attaches the LED substrate 430 to the holding member 420 by fitting the positioning holes 435a and 435b formed in the LED substrate 430 on the positioning protrusions 422a and 422b (the LED substrate holding portion 422) formed on the holding member 420.

As a result, the LED 410 is positioned and held via the LED substrate 430, in a state where the light emitting face faces the end face on the tip end 340b side of the light guiding member 340.

Subsequently, the operator attaches the holding member 420, which positions and holds the LED 410 and the light guiding member 340, to the body frame 311a (the first frame body 311).

More specifically, as shown in FIG. 3, the operator places the holding member 420 on the outer wall portions 3111 and 3112 of the body frame 311a of the first frame body 311.

The operator fits the positioning hole, which is formed on the base end 340a side of the holding member 420, on the positioning pin 511 of the outer wall portions 3111, and fits the notch portion, which is formed on the tip end 340b side, on the positioning protrusion 512.

As a result, the holding member 420 is positioned and held to the body frame 311a (the first frame body 311).

Subsequently, as shown in FIG. 2, the operator disposes the two cover members 311b and 311c so as to cover the upper opening of the body frame 311a.

In this way, the light emitting unit 400 in the present embodiment is assembled.

According to the present embodiment, it is possible to provide an image reading device, in which a light guiding member can be positioned with high accuracy with a simple configuration.

Moreover, according to the present embodiment, the image reading device 300 has the light guiding member holding mechanism 450 (holding member 420), which disposes the light guiding member 340 along the main scanning direction Y, and which positions and holds the end portion of the tip end 340b side in the main scanning direction Y.

As a result, the image reading device 300 can maintain the distance between the LED 410 and end face of the light guiding member 340 constant.

In addition, according to the present embodiment, in the image reading device 300, the first movement restricting portion 600 restricts the light guiding member 340 from moving toward the LED 410 side in the main scanning direction Y, and the second movement restricting portion 650 restricts the light guiding member 340 from moving toward the side opposite to the LED 410 side in the main scanning direction Y.

As a result, the image reading device 300 can position and hold the light guiding member 340 with high accuracy.

Furthermore, according to the present embodiment, in the image reading device 300, the first movement restricting portion 600 and the second movement restricting portion 650 restrict movement of the tip end 340b on the LED 410 side of the light guiding member 340; therefore, in a case in which the light guiding member 340 thermally expands, the base end 340a on the side opposite to the LED 410 side moves in the main scanning direction Y.

As a result, in the image reading device 300, even in a case in which the light guiding member 340 thermally expands, the distance between the LED 410 and the end face of the light guiding member 340 is maintained constant.

Moreover, according to the present embodiment, the positional relationship between the LED 410 and the end face of light guiding member 340 is extremely important, for which highly accurate positioning is required, whereas the image reading device 300 has a structure for positioning (restricting movement of) the light guiding member 340 in the vicinity of the tip end 340b of the light guiding member 340, for which highly accurate positioning is required.

As a result, the image reading device 300 achieves highly accurate positioning of the light guiding member 340, and maintains a state of such positioning.

In addition, according to the present embodiment, the image reading device 300 is configured such that the second movement restricting portion 650 does not restrict the restricted portion 700 from moving toward the LED 410 side, but restricts the restricted portion 700 from moving toward the side opposite to the LED 410 side in the main scanning direction Y.

As a result, simply by the operator to insert the light guiding member 340 into the holding member 420, the image reading device 300 can position and hold the light guiding member 340 as described above.

Furthermore, according to the present embodiment, the image reading device 300 is configured such that the holding member 420 holds the light guiding member 340 in a state where the end face on the LED 410 side of the light guiding member 340 is separated from the LED 410 at a predetermined distance.

As a result, the image reading device 300 can suppress the light guiding member 340 from thermally expanding due to heat from the LED 410. Moreover, in a case in which the light guiding member 340 thermally expands, the image reading device 300 can suppress the LED 410 from being deformed or the like due to contact of the light guiding member 340, which has thermally expanded, with the LED 410.

In addition, according to the present embodiment, the positioning and holding of the light guiding member 340 can be implemented by way of a simple operation of inserting the light guiding member 340 through the hole portion as the light guiding member holding portion 423. As a result, the image reading device 300 (the light emitting unit 400) improves the workability in assembly.

Furthermore, in the image reading device 300 of the present embodiment, the LED 410 is positioned and held to the holding member 420 as a result of the LED substrate 430 being attached to the holding member 420.

According to the present embodiment, the LED 410 is positioned by using the LED substrate 430 that is a larger part as compared to the LED 410; therefore, the image reading device 300 improves the workability in assembly, and improves the accuracy of positioning the LED 410.

Moreover, the image forming apparatus including the image reading device 300 of the present embodiment also achieves effects similar to the effects described above.

Although a preferred embodiment has been described above, the present disclosure can be implemented in various modes without being limited to the aforementioned embodiment.

For example, the image forming apparatus of the present disclosure is not particularly limited, and can be a copy machine, a printer, a facsimile machine, or a multi-functional printer having functions thereof.

The sheet-shaped transferred material is not limited to paper, and may be a film sheet, for example.

The invention claimed is:

1. An image reading device, comprising:
a light emitting portion;
a stick-like light guiding member, one end portion thereof in a main scanning direction being disposed to face the light emitting portion and another end portion thereof being disposed more distant from the light emitting portion than the one end portion;
a holding member that holds the light emitting portion and the light guiding member, the holding member including
a holding portion that disposes the light guiding member along the main scanning direction, and positions and holds the one end portion of the light guiding member; and
a case member that holds the holding member,
wherein the holding portion is configured to position and hold the light guiding member such that the one end of the light guiding member does not move towards the light emitting portion and the other end portion of the light guiding member is movable in a direction departing from the light emitting portion.

2. The image reading device according to claim 1, wherein
the light guiding member has a protrusion in a vicinity of the one end portion thereof, the protrusion protruding in a direction orthogonal to the main scanning direction, and
the holding portion has a first abutting portion that abuts a first side surface of the protrusion near the light emitting portion in the main scanning direction, and a second abutting portion that abuts a second side surface of the protrusion which is more distant from the light emitting portion than the first side surface in the main scanning direction.

3. The image reading device according to claim 2, wherein the second abutting portion does not restrict the protrusion from moving toward the light emitting portion in the main scanning direction, but restricts the protrusion from moving apart from the light emitting portion in the main scanning direction.

4. The image reading device according to claim 3, wherein the second abutting portion is formed to extend in the main scanning direction, and is a cantilever-like member with a free end on the light emitting portion side,
the free end of the second abutting portion is configured to undergo flexural deformation to separate from the light guiding member in the direction orthogonal to the main scanning direction as a result of movement of the protrusion toward the light emitting portion, and
the second abutting portion restricts the protrusion from moving in a state where the second abutting portion abuts the second side surface of the protrusion.

5. The image reading device according to claim 1, wherein the holding member holds the light guiding member in a state where an end face of the one end portion of the light guiding member is separated from the light emitting portion at a predetermined distance.

6. An image forming apparatus, comprising:
a light emitting portion;
a stick-like light guiding member, one end portion thereof in a main scanning direction being disposed to face the light emitting portion and another end portion thereof being disposed more distant from the light emitting portion than the one end portion;
a holding member that holds the light emitting portion and the light guiding member, the holding member including
a holding portion that disposes the light guiding member along the main scanning direction, and positions and holds the one end portion of the light guiding member; and
a case member that holds the holding member,
wherein the holding portion is configured to position and hold the light guiding member such that the one end of the light guiding member does not move towards the light emitting portion and the other end portion of the light guiding member is movable in a direction departing from the light emitting portion.

7. The image forming apparatus according to claim 6, wherein
the light guiding member has a protrusion in a vicinity of the one end portion thereof, the protrusion protruding in a direction orthogonal to the main scanning direction, and
the holding portion has a first abutting portion that abuts a first side surface of the protrusion near the light emitting portion in the main scanning direction, and a second abutting portion that abuts a second side surface of the protrusion which is more distant from the light emitting portion than the first side surface in the main scanning direction.

8. The image forming apparatus according to claim 7, wherein
the second abutting portion does not restrict the protrusion from moving toward the light emitting portion in the main scanning direction, but restricts the protrusion from moving apart from the light emitting portion in the main scanning direction.

9. The image forming apparatus according to claim 8, wherein
the second abutting portion is formed to extend in the main scanning direction, and is a cantilever-like member with a free end on the light emitting portion side,
the free end of the second abutting portion is configured to undergo flexural deformation to separate from the light guiding member in the direction orthogonal to the main scanning direction as a result of movement of the protrusion toward the light emitting portion, and
the second abutting portion restricts the protrusion from moving in a state where the second abutting portion abuts the second side surface of the protrusion.

10. The image forming apparatus according to claim 6, wherein the holding member holds the light guiding member in a state where an end face of the one end portion of the light guiding member is separated from the light emitting portion at a predetermined distance.

* * * * *